United States Patent
Moon, Jr. et al.

(10) Patent No.: US 9,194,091 B2
(45) Date of Patent: Nov. 24, 2015

(54) WIRELESS SNOW PLOW CONTROL

(71) Applicant: THE TORO COMPANY, Bloomington, MN (US)

(72) Inventors: James E. Moon, Jr., Crystal Falls, MI (US); Jody Christy, Iron Mountain, MI (US); Gary Laird Blank, Appleton, WI (US)

(73) Assignee: THE TORO COMPANY, Bloomington, MN (US)

( * ) Notice: Subject to any disclaimer, the term of this patent is extended or adjusted under 35 U.S.C. 154(b) by 156 days.

(21) Appl. No.: 13/778,357

(22) Filed: Feb. 27, 2013

(65) Prior Publication Data

US 2014/0052335 A1  Feb. 20, 2014

Related U.S. Application Data

(60) Provisional application No. 61/683,904, filed on Aug. 16, 2012.

(51) Int. Cl.
| | | |
|---|---|---|
| *E01H 5/00* | (2006.01) | |
| *E01H 5/06* | (2006.01) | |
| *B60Q 1/18* | (2006.01) | |
| *B60Q 1/26* | (2006.01) | |
| *B60Q 1/00* | (2006.01) | |

(52) U.S. Cl.
CPC ............... *E01H 5/06* (2013.01); *B60Q 1/0088* (2013.01); *B60Q 1/18* (2013.01); *B60Q 1/26* (2013.01); *B60Q 2900/30* (2013.01)

(58) Field of Classification Search
None
See application file for complete search history.

(56) References Cited

U.S. PATENT DOCUMENTS

| | | |
|---|---|---|
| 4,062,135 A | 12/1977 | Dobberpuhl |
| 4,776,750 A | 10/1988 | Griswold, Jr. et al. |
| 5,361,519 A | 11/1994 | Ciula et al. |
| 5,420,480 A | 5/1995 | Knepel et al. |
| 5,512,892 A | 4/1996 | Corballis et al. |
| 5,524,368 A | 6/1996 | Struck et al. |
| 5,638,619 A | 6/1997 | Bowling |
| 5,704,429 A | 1/1998 | Lee et al. |
| 5,746,261 A | 5/1998 | Bowling |
| 5,884,206 A | 3/1999 | Kim |
| 6,005,300 A | 12/1999 | Kelly |
| 6,061,617 A | 5/2000 | Berger et al. |
| 6,085,846 A | 7/2000 | Buchl et al. |
| 6,112,139 A | 8/2000 | Schubert et al. |
| 6,154,122 A | 11/2000 | Menze |
| 6,163,985 A | 12/2000 | Chinnery et al. |

(Continued)

*Primary Examiner* — John R Olszewski
*Assistant Examiner* — Gerrad A Foster
(74) *Attorney, Agent, or Firm* — Marshall, Gerstein & Borun LLP

(57) ABSTRACT

Wireless snow plow control methods and systems may include at least three units in mutual wireless communicative connection: a plow control module (PCM), a vehicle control module (VCM), and a remote controller. Each unit may be capable of operating with any one of a plurality of units of another type, with any one of multiple types of vehicles, and with any one of multiple types of snow plows. Three specific units of different types may automatically synchronize for operating a particular snow plow in response to commands from the remote. The VCM may be capable of automatically detecting a connection status of a snow plow, enabling/disabling snow plow lights and vehicle lights based on the connection status, controlling enabled vehicle lights, and wirelessly controlling enabled snow plow lights. The remote may wirelessly transmit commands either directly to the PCM, or to the VCM for forwarding to the PCM.

12 Claims, 26 Drawing Sheets

(56) References Cited

U.S. PATENT DOCUMENTS

| | | |
|---|---|---|
| 6,396,210 B1 | 5/2002 | Menze |
| 6,504,306 B2 | 1/2003 | Menze |
| 6,542,789 B2 | 4/2003 | Ufheil |
| 6,662,881 B2 | 12/2003 | Domann |
| 6,715,696 B2 | 4/2004 | Pierce |
| RE38,665 E | 12/2004 | Struck et al. |
| 6,850,221 B1 | 2/2005 | Tickle |
| 6,852,934 B1 | 2/2005 | Lashua |
| 6,982,648 B2 | 1/2006 | Cros et al. |
| 7,084,570 B2 | 8/2006 | Oyaski |
| 7,089,721 B2 | 8/2006 | Turner et al. |
| 7,099,722 B2 | 8/2006 | Casey |
| 7,137,724 B2 | 11/2006 | Menze et al. |
| D567,243 S | 4/2008 | Ashida et al. |
| 7,400,058 B1 * | 7/2008 | Wayne et al. .................. 307/9.1 |
| D594,066 S | 6/2009 | Oikawa et al. |
| D600,697 S | 9/2009 | Swiader |
| 7,586,050 B2 | 9/2009 | Lashua |
| 7,665,233 B2 | 2/2010 | Lemieux et al. |
| D611,477 S | 3/2010 | Brunner et al. |
| 7,681,340 B2 | 3/2010 | Treuthardt |
| 7,762,698 B2 | 7/2010 | Menze |
| 7,856,301 B2 | 12/2010 | Sjogren et al. |
| 8,068,961 B2 | 11/2011 | Menze |
| 8,162,521 B2 | 4/2012 | Menze et al. |
| 8,185,276 B2 | 5/2012 | Buckbee et al. |
| 2006/0016993 A1 | 1/2006 | Zovich |
| 2008/0073090 A1 | 3/2008 | Harris |
| 2008/0201994 A1 | 8/2008 | Crago |
| 2009/0119954 A1 | 5/2009 | Lemieux et al. |
| 2009/0309779 A1 * | 12/2009 | Buckbee et al. .............. 341/176 |
| 2009/0312904 A1 | 12/2009 | Menze |
| 2010/0217475 A1 | 8/2010 | Menze et al. |
| 2011/0100183 A1 | 5/2011 | Tomaino |

* cited by examiner

FIG. 5A

| Synch Control | LED Color | Rate | Vehicle | Plow |
|---|---|---|---|---|
| Open | None | | Unit not powered, Ignition off. Less than 9 VDC, module has no address (not programmed by the factory) | Unit not powered, ignition off. Less than 9 VDC, module has no address (not programmed by the factory) |
| | Green | 5 second blink | No plow attached or communication | No plow attached or communication |
| | | 1 second blink | Plow attached and communicating and VCM has information to send to plow | Plow attached and communicating and VCM has information to send to plow |
| | | Solid on | PCM, VCM and Hand control are communicating. Remote may not transmit for timeout duration (e.g., 20 minutes or configurable) but light will stay on unless remote sends power down | PCM, VCM and Hand control are communicating. Remote may not transmit for timeout duration but light will stay on unless remote sends power down |
| | Red | 5 second blink | Signaling burnt out bulb to vehicle. Signal is only on if the high or low beam signal is "on" | Signaling burnt out bulb to vehicle. Signal is only on if the high or low beam signal is "on" |
| | | 1 second blink | Voltage on ignition input is too low to run plow. A signal voltage of more than 9 VDC on the ignition input is required. | Voltage too low to run plow with a signal voltage of more than 9 VDC on the ignition input. |
| | | Solid on | Voltage too low to run plow or lights | Voltage too low to run plow or lights |
| | Orange | 1 second blink | Needs valid addresses | Needs valid addresses |
| | | Solid on | In listen mode - time out interval (e.g., 5 minutes or configurable) | In listen mode - time out interval |

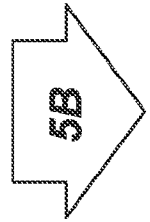

| | | | |
|---|---|---|---|
| Open | Orange>Green | Green/Orange Toggle 1 second<br>Red/Orange Toggle 1 second | Signal strength from vehicle above 90db. In sync mode.<br>Ignition voltage too low to run plow.<br>No unit address | Signal strength from vehicle above 90db. In sync mode.<br>Ignition voltage too low to run plow.<br>No unit address |
| Pressed for less then one second. | | Orange | Solid on | Goes to listen mode | Goes to listen mode |
| Pressed for more then 1 second. | | Red | On for 3 seconds - Off for 3 seconds | | Unit is programmed to V blade if switch is released when LED is on. LED will toggle orange/red for toggle interval (e.g. 6 seconds or configurable).<br>Unit is programmed to straight blade if switch is released when LED is off. LED will toggle orange/green for toggle interval. |

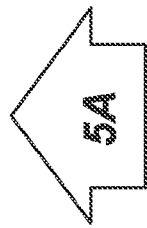
5A

*FIG. 5B*

WIRELESS SNOW PLOW CONTROL

CROSS REFERENCE TO RELATED APPLICATIONS

This application claims the benefit of U.S. Provisional Application No. 61/683,904, entitled "Wireless Snow Plow Control" which was filed on Aug. 16, 2012, the entire disclosure of which is hereby incorporated by reference herein. Additionally, this application is related to U.S. patent application Ser. No. 13/778,365, entitled "Safety systems for Wireless Control for Snow Plows" and filed concurrently herewith, the entire disclosure of which is hereby incorporated by reference herein.

BACKGROUND OF THE DISCLOSURE

1. Field of the Disclosure

This disclosure relates generally to wireless control of a snow plow that is mounted on a vehicle, and more particularly, to wireless control of one or more lights mounted on the snow plow, and reliable and robust wireless control of the snow plow.

2. Background Description

Conventional wireless snow plow operation control systems include a plow controller mounted on a plow and a user remote controller in wireless communication with the plow controller. When wireless communication channels between the plow controller and the user remote are unsuitable or unusable, the plow controller and the user remote controller of such systems are unable to communicate to control operations of the snow plow.

Conventional snow plow lighting control systems include user-activated controls for controlling vehicle lights, a vehicle wiring harness connecting the user-activated controls to the vehicle's electrical system and lights, and a plug or other coupler(s) to connect the vehicle wiring harness to a snowplow's wiring harness. The wiring harnesses and plug/couplers carry signals to power and control the snowplow's headlights, turn signals, daytime running lamps, and/or other lights mounted on the snow plow, if equipped. Such plugs or other couplers between the vehicle and snowplow wiring harnesses, when exposed to harsh elements routinely encountered by snow plows (e.g., snow, water, road salt, dirt, debris and sub-freezing temperatures), are susceptible to short circuits or to partial or complete disengagement, undesirably interrupting continuous snow plow controllability.

Conventional snow plow lighting control systems also require a switch to indicate whether or not snow plow lights are to be enabled or vehicle lights are to be enabled. For example, U.S. Patent Publication No. 2008/0073090 teaches wireless remote control operation of the headlights and blinkers of a working implement, such as a snow plow that can be attached to a vehicle. In U.S. Patent Publication No. 2008/0073090, turn lighting signals and park lighting signals on the plow and on the vehicle are simultaneously and redundantly enabled for operation. Vehicle-mounted headlights, though, may be disabled when plow-mounted headlights are enabled based on a switch that is manipulated by an operator, as taught in this patent publication. For example, the operator or user must manipulate the switch to indicate whether plow-mounted lights should be operational and vehicle lights should be disabled, or whether vehicle-mounted lights should be operational and plow lights should be disabled. Furthermore, U.S. Patent Publication No. 2008/0073090 teaches that if an operator switch is omitted from the system, both the plow headlights and the vehicle headlights remain simultaneously enabled, in a manner similar to the turn and parking lights.

In another system taught in U.S. Pat. No. 7,400,058, a vehicle controller (rather than a user or operator) may cause the substitution of plow light operation for vehicle light operation. In this system, however, the vehicle controller receives power only when a snow plow is connected to the vehicle, and is not operational to provide any functionality at all when a snow plow is disconnected.

BRIEF DESCRIPTION OF SEVERAL VIEWS OF THE DRAWING

FIGS. 5A and 5B include a chart describing an embodiment of interactions, relationships and actions of various units and components of the wireless snow plow control system of FIG. 1;

DETAILED DESCRIPTION OF THE PREFERRED EMBODIMENTS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of the application for this patent, which would still fall within the scope of the claims.

Figure 1:
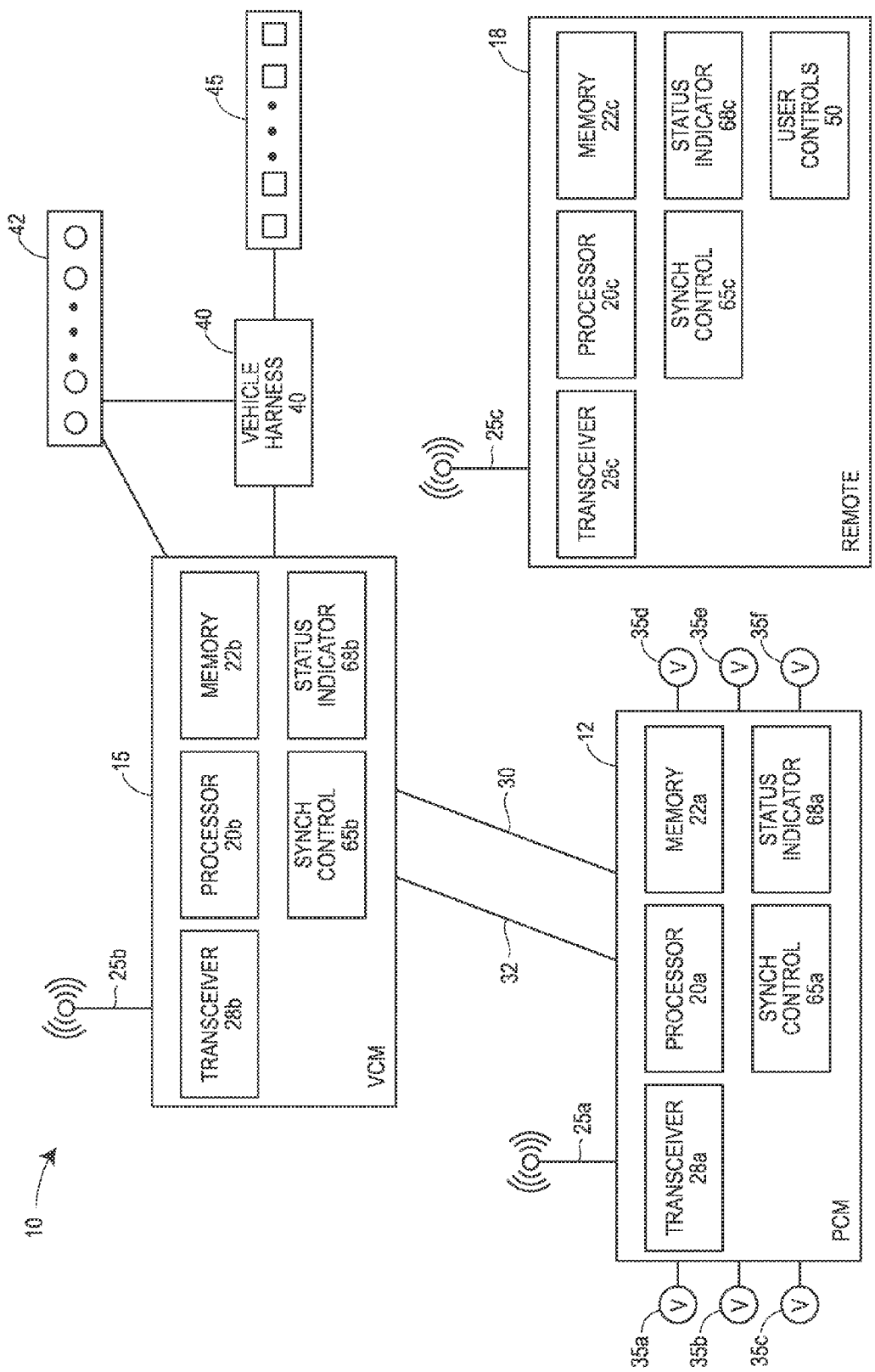
FIG. 1 is a functional block diagram of an embodiment of a wireless control system for a snow plow that is mountable on, or mounted on, a vehicle.

FIG. 1 is a functional block diagram of an embodiment of a wireless control system 10 for a snow plow that is mountable on a vehicle, or is mounted on a vehicle. The wireless control system 10 may include a plow control module 12 (also interchangeably referred to herein as a "PCM" or a "plow controller") mounted on a snow plow, a vehicle control module 15 (also interchangeably referred to herein as a "VCM" or a "vehicle controller") mounted on the vehicle, and a hand-held controller 18 (also interchangeably referred to herein as a "remote control," "remote," "remote controller," "hand-held remote," or "operator controller"). The hand-held controller 18 is for operator use and may typically be disposed within a cab or within an operator's reach while he or she is operating the vehicle. Each unit 12, 15, 18 of the wireless control system 10 may include a respective processor 20a, 20b, 20c (also referred to herein as a "central processing unit" or "CPU") and a respective non-transitory, tangible memory 22a, 22b, 22c storing instructions that are executable by the processor 20a, 20b, 20c. Each unit 12, 15, 18 may further include a respective antenna 25a, 25b, 25c and a corresponding transceiver or transmitter/receiver pair 28a, 28b, 28c in connection with the antenna 25a, 25b, 25c to send and receive wireless communications, messages, packets or signals to the other units. The transceiver or transmitter/receiver pair 28a, 28b, 28c may be in communicative connection with the processor 20a, 20b, 20c to generate communications signals and to receive and process communications signals. Each unit 12, 15, 18 may be connected to an internal or external power source.

With respect to the plow control module 12, in an embodiment, the PCM 12 may be in wired connection with the vehicle via a ground cable 30 and a power cable 32 through which power is received at the PCM 12. For example, the power cable 32 may supply power to the PCM 12 from the vehicle's battery. The ground cable 30 and the power cable 32 may be the only wired connections between the PCM 12 and the vehicle, in an embodiment. In another embodiment, no wired connections between the PCM 12 and the vehicle are necessary and the ground cable 30 and the power cable 32 may be omitted, such as when the PCM 12 is self-powered by a battery or by some other suitable power storage entity disposed at or on the snow plow (not shown).

In an embodiment where the PCM 12 is connected to a ground cable 30 and a power cable 32, the antenna 25a of the plow control module 12 may be routed at least partially inside a wiring loom that surrounds a wiring harness of the PCM connected to the ground cable 30 and the power cable 32 (not shown). For example, the antenna 25a of the PCM 12 may be externally disposed to a wiring bundle inside the wiring loom to improve the quality of wireless communications. In this example, however, even when the antenna 25a is externally disposed to the wiring bundle, the antenna 25a may still remain disposed within the wiring loom itself to provide protection against the elements (e.g., water, mud, salt, snow, rain, etc.).

The plow control module 12 may be in wireless communicative connection with the hand-held controller 18. In an embodiment, the plow control module 12 may receive, from the hand-held controller 18 via the antenna 25a, wireless communications, packets, messages or signals that correspond to one or more commands relating to one or more desired operations of the snow plow. In an embodiment, at least a portion of the one or more commands may be received at the hand-held controller 18 via a user interface. In some situations, the one or more commands may be automatically generated by the wireless control system 10 or by other control systems, such as a safety stop in an emergency situation.

In an embodiment, the PCM 12 may acknowledge at least some of the wireless communications received from the hand-held controller 18. Typically, the processing of the received wireless communications and the generation of wireless communications (such as acknowledgements) may be performed by the processor 20a of the PCM 12.

To effect the desired operations of the snow plow indicated by wireless communications received from the hand-held controller 18, the plow control module 12 may be in connection with a hydraulic system of the snow plow to operate the snow plow. In particular, the PCM 12 may be connected to one or more hydraulic valves 35a-f (e.g., via a valve manifold or other suitable connection mechanism) to activate and/or deactivate (e.g., actuate and/or deactuate) any one or any combination of the valves 35a-35f to control various operations of elements of the snow plow. While FIG. 1 illustrates an example configuration having six valves 35a-35f, any suitable number of valves may be in connection with the plow control module 12.

Activation or actuation of hydraulic valves may be performed by using any known technique such as by energizing or de-energizing solenoids or other transducers, or by some other suitable technique. In an embodiment, hydraulic valves 35a-35f may be solenoid valves which include a solenoid attached to a hydraulic valve. While the techniques herein are described with respect to a hydraulic system on a snow plow, in some embodiments, the PCM 12 may be in connection with some other suitable system other than a hydraulic system via which snow plow operations may be performed.

Based on the commands received from the hand-held controller 18, the processor 20a of the PCM 12 may cause any one or any combination of the valves 35a-35g to be activated or deactivated to control various operations of elements of the snow plow. For example, the PCM 12 may activate and/or deactivate the appropriate valve or valves to perform blade operations (e.g., angle, raise, lower, or vee), hitch or connection operations (e.g., attach, detach) and/or pump operations (e.g., start, stop). For example, activating or actuating a first hydraulic valve may cause a right wing of a V-blade snow plow to extend, de-activating or de-actuating a second hydraulic valve may cause the plow blade to lower, and actuating a pump start solenoid valve may cause a hydraulic pump to be activated. In an embodiment, the PCM 12 may be in connection with a down pressure solenoid, and the PCM 12 may be capable of activating down pressure of the snow plow via the down pressure solenoid.

Additionally, the plow control module 12 may be in communicative connection with one or more plow lights mounted on the snow plow, such as a plow headlight, a plow turn signal, a plow reverse light, or a plow daytime running lamp. In an embodiment, the plow control module may be electrically connected (e.g., via wired, wireless or both wired and wireless connections) with at least one of a plow headlight, a plow turn signal, or a plow daytime running lamp. The plow control module 12 may provide signals to the one or more plow lights for operation (e.g., on, off, blinking, high or low beam, tilt, move). User control of the one or more plow lights via the plow control module 12 is discussed in a later section of this application.

Figure 2A:
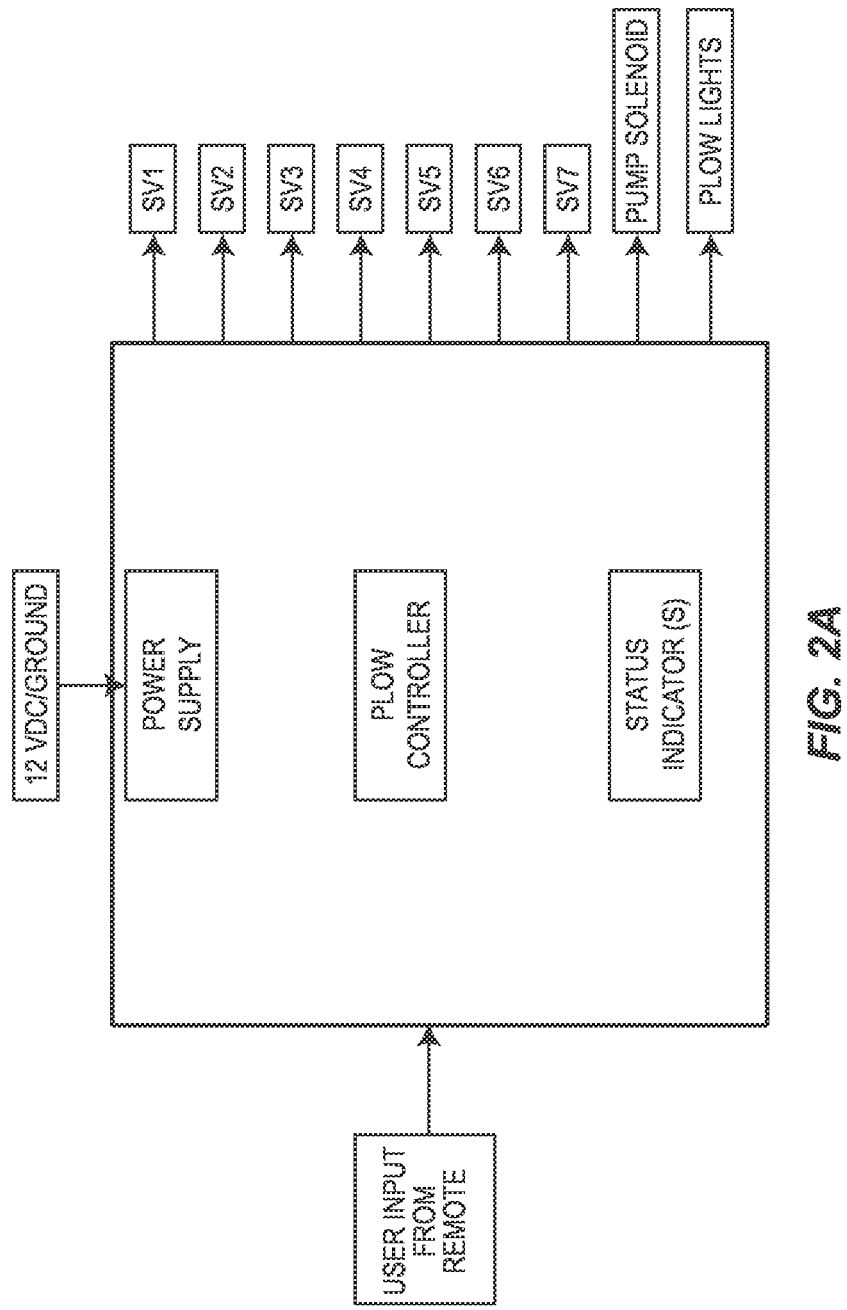
FIG. 2A is an example functional block diagram of the plow control module of FIG. 1.
Figure 2B:
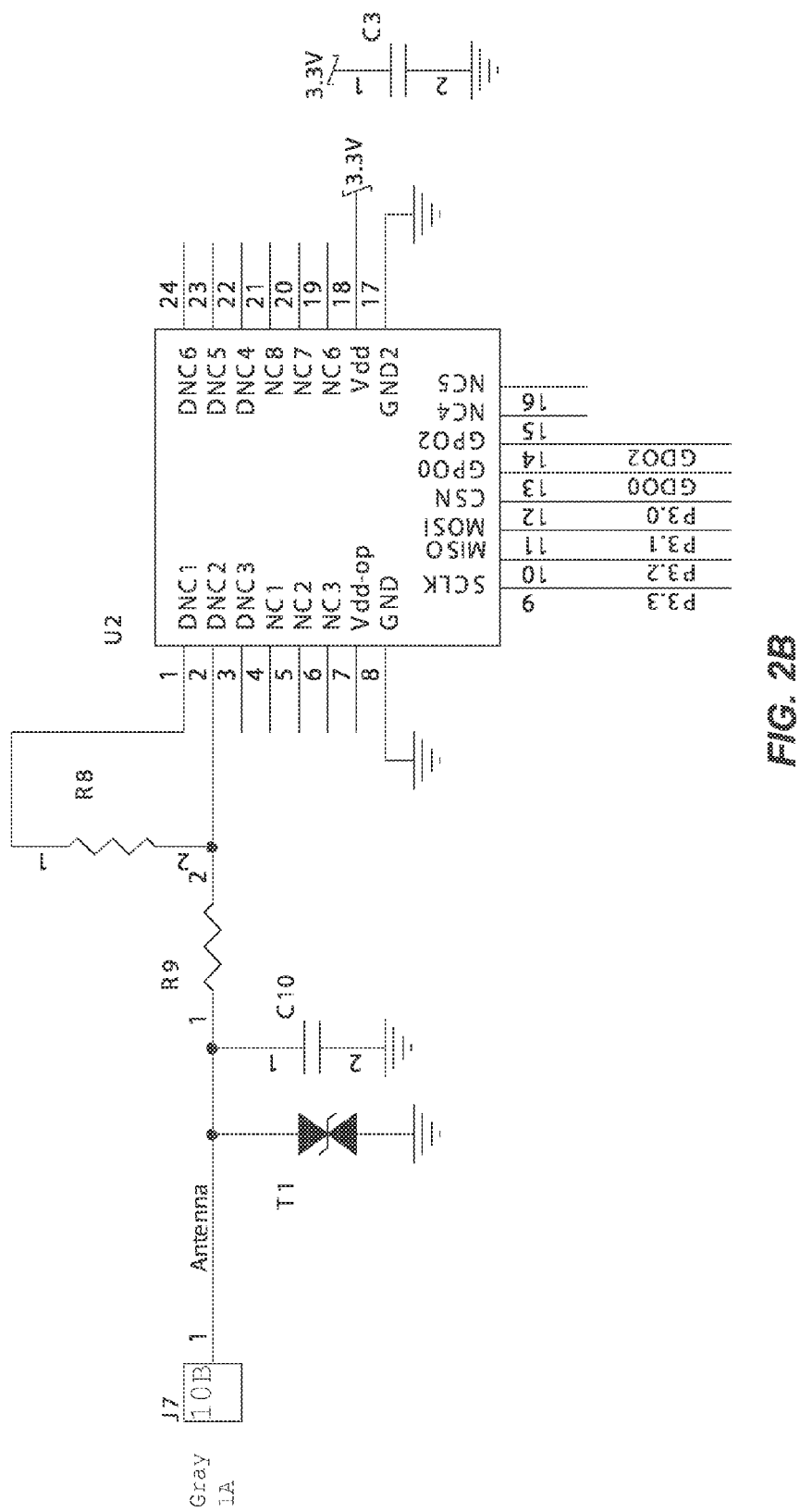
FIGS. 2B to 2K each illustrates a portion of a detailed electrical schematic of an embodiment of the plow control module.
Figure 2C:
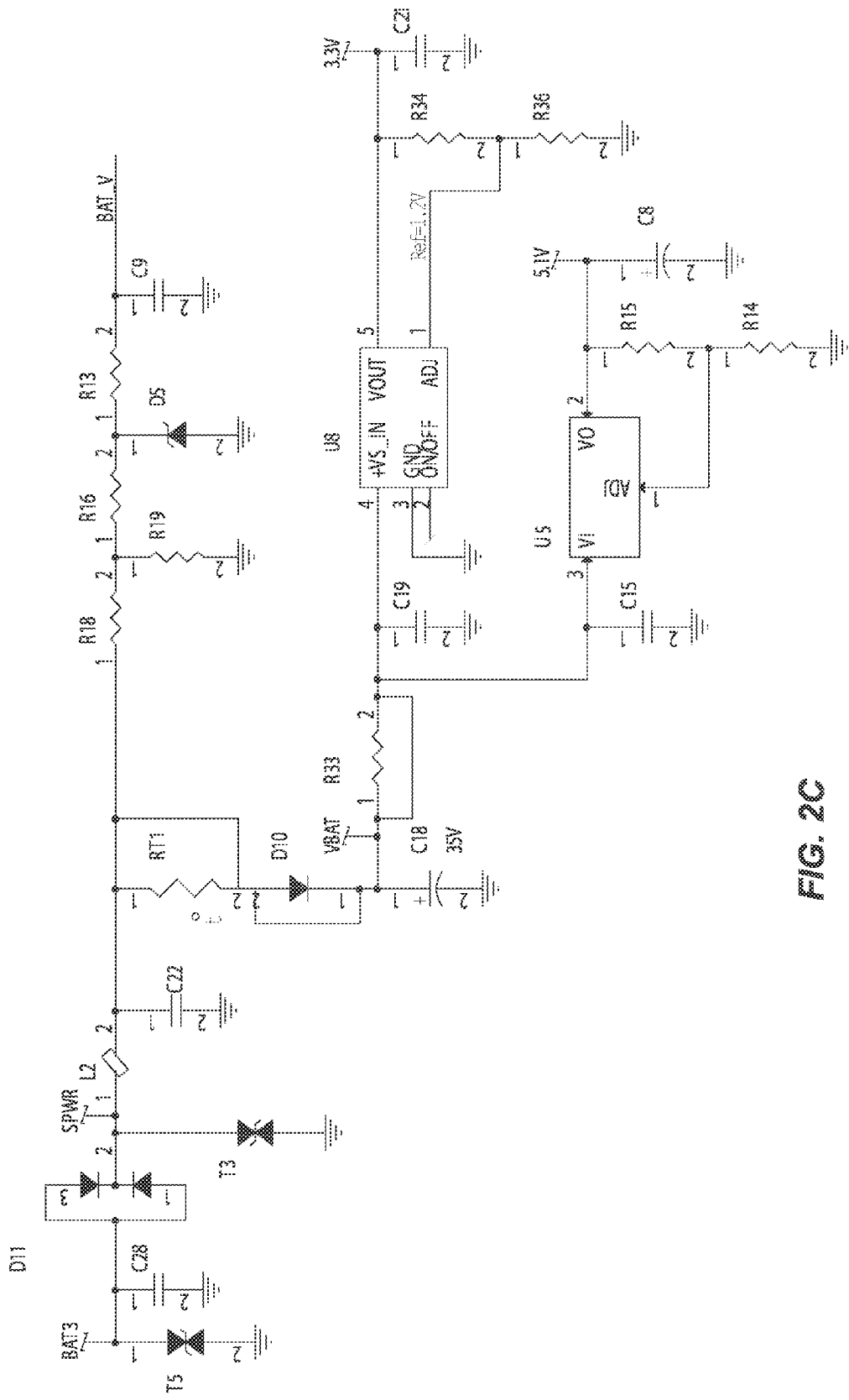
Figure 2D:
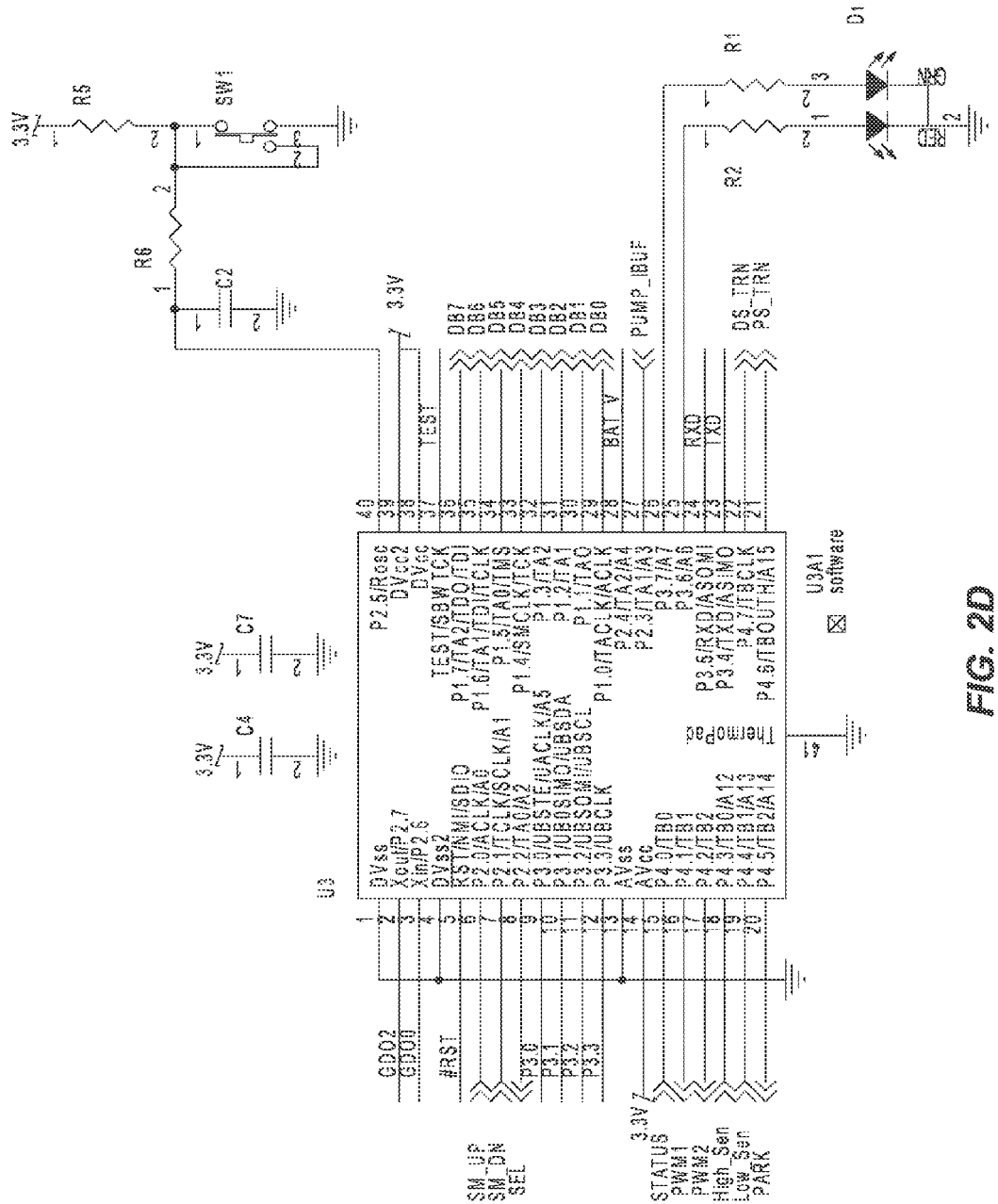
Figure 2E:
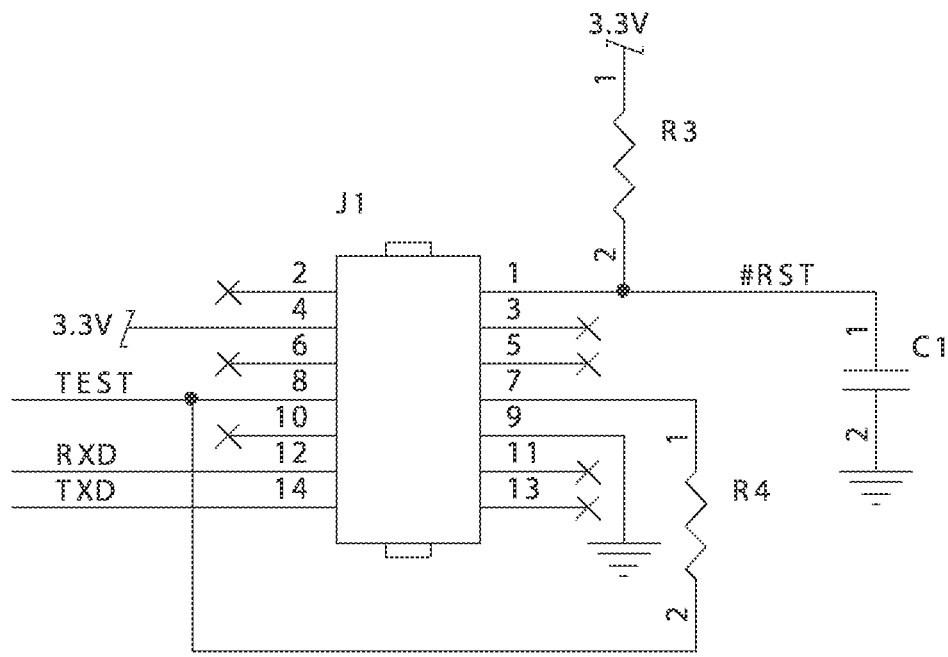
Figure 2F:
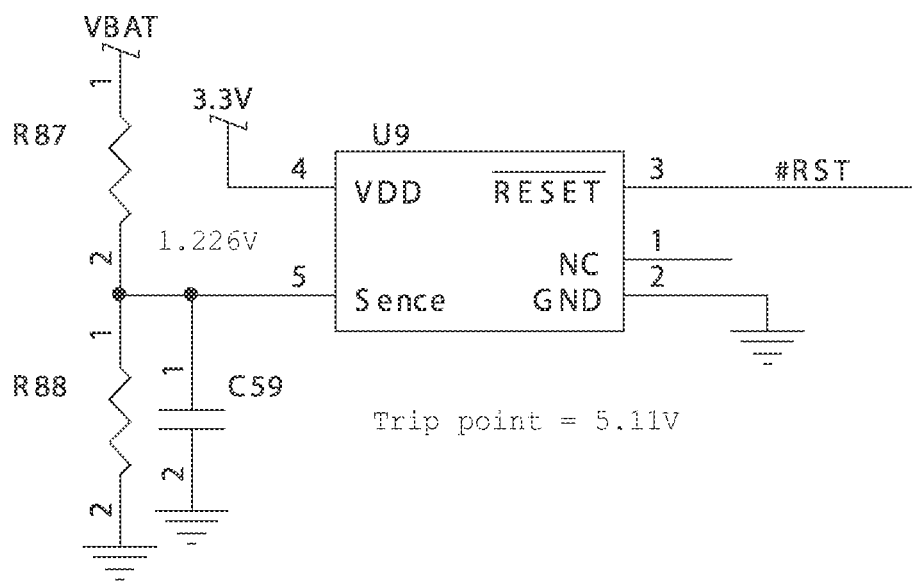
Figure 2G:
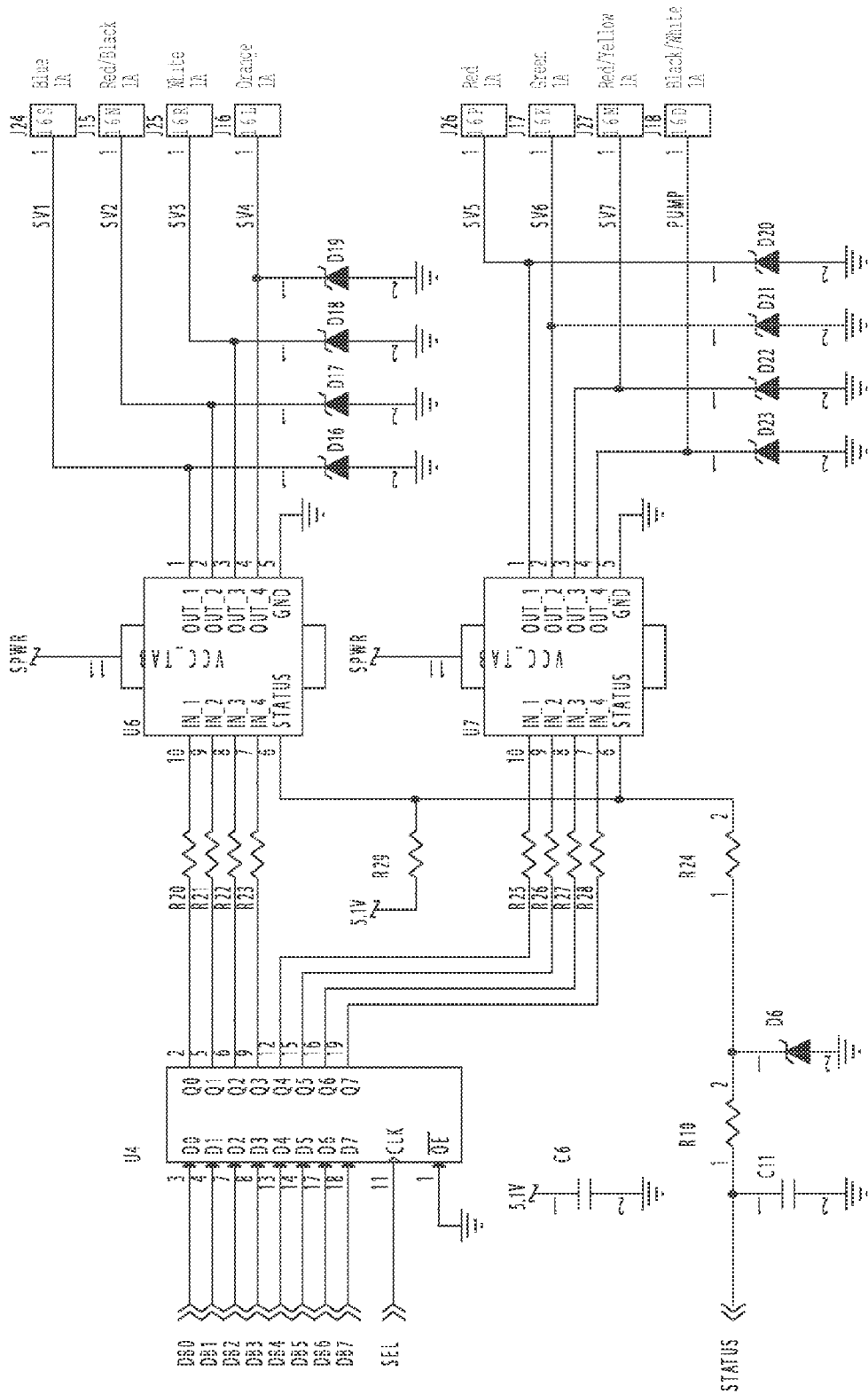
Figure 2H:
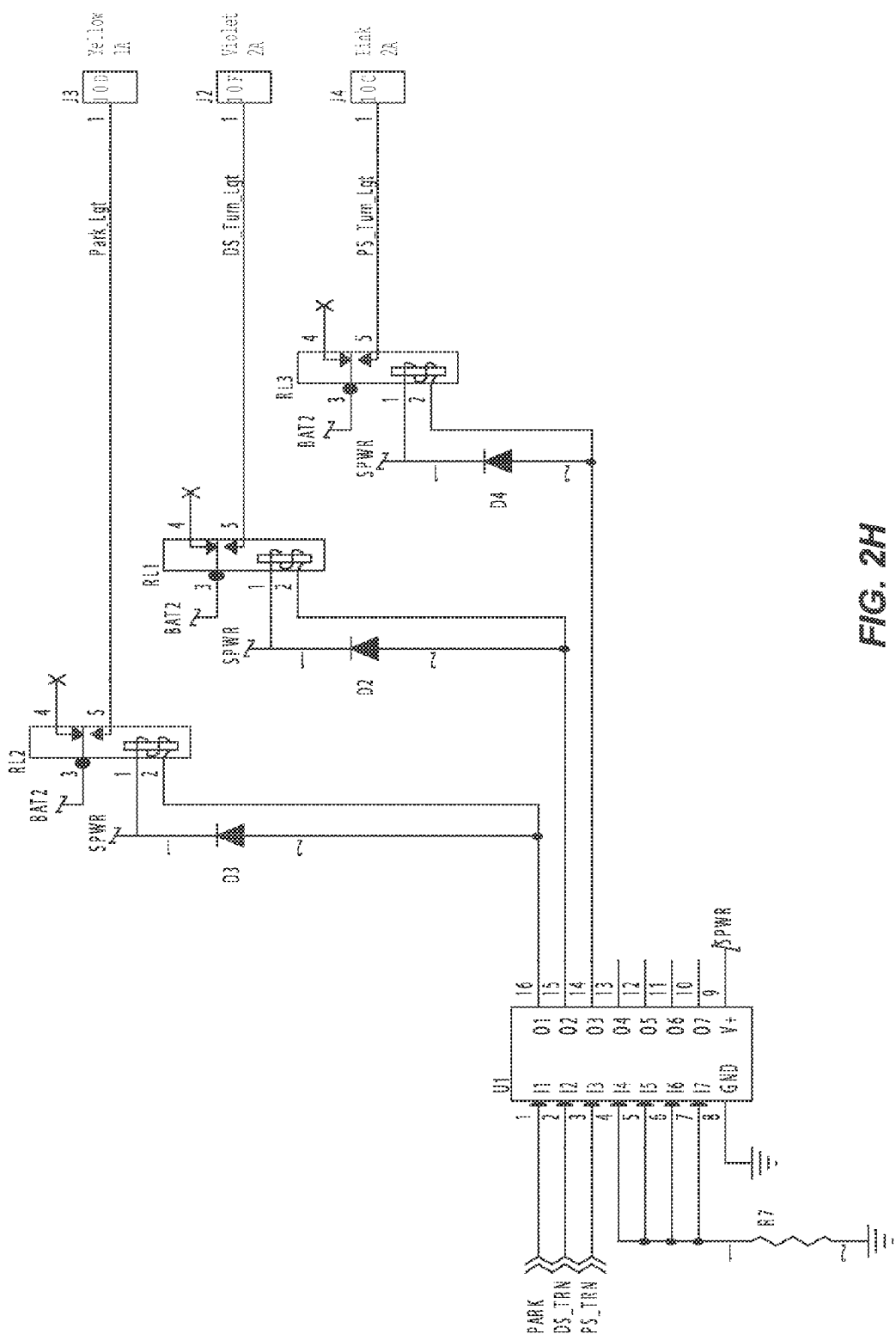
Figure 2I:
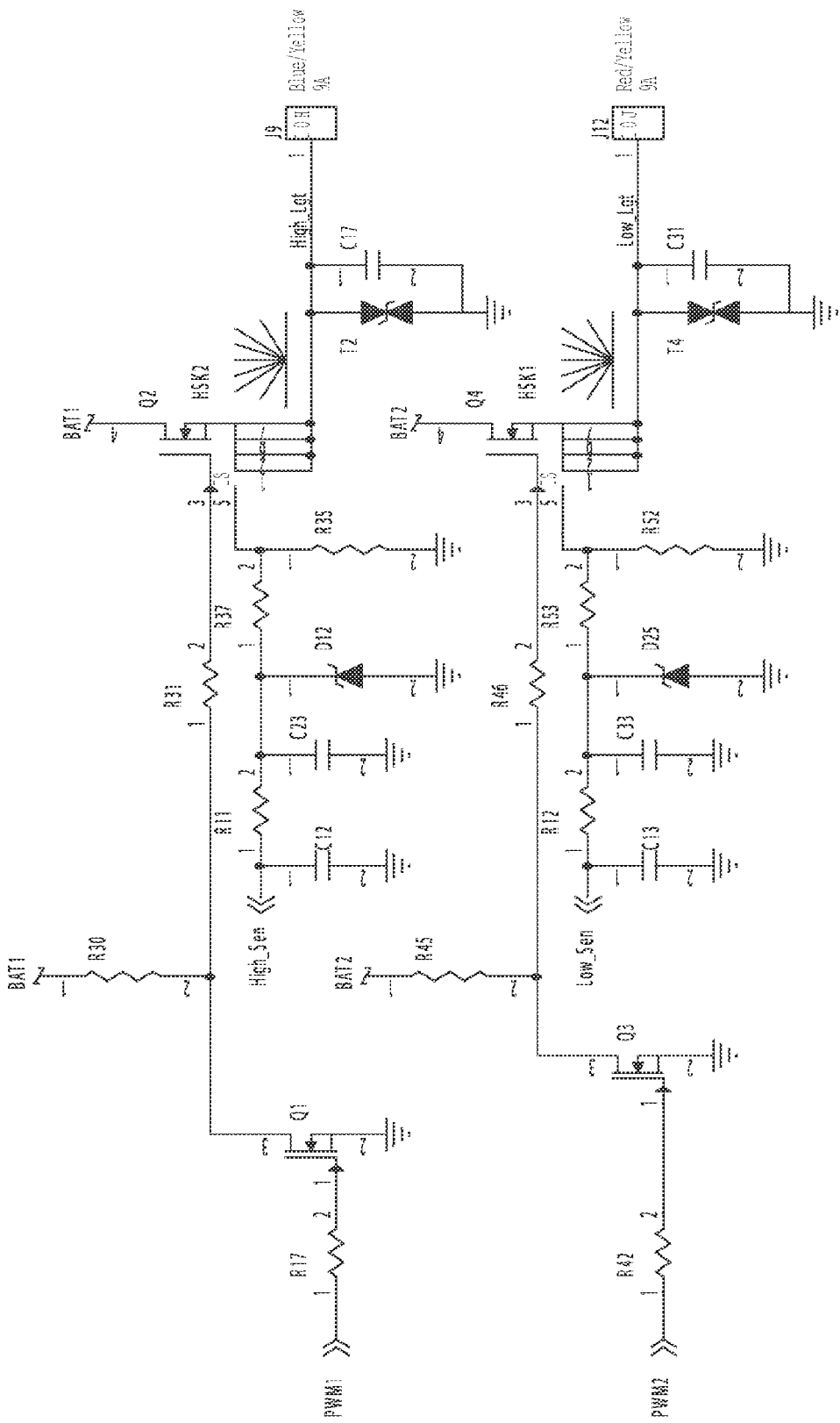
Figure 2J:
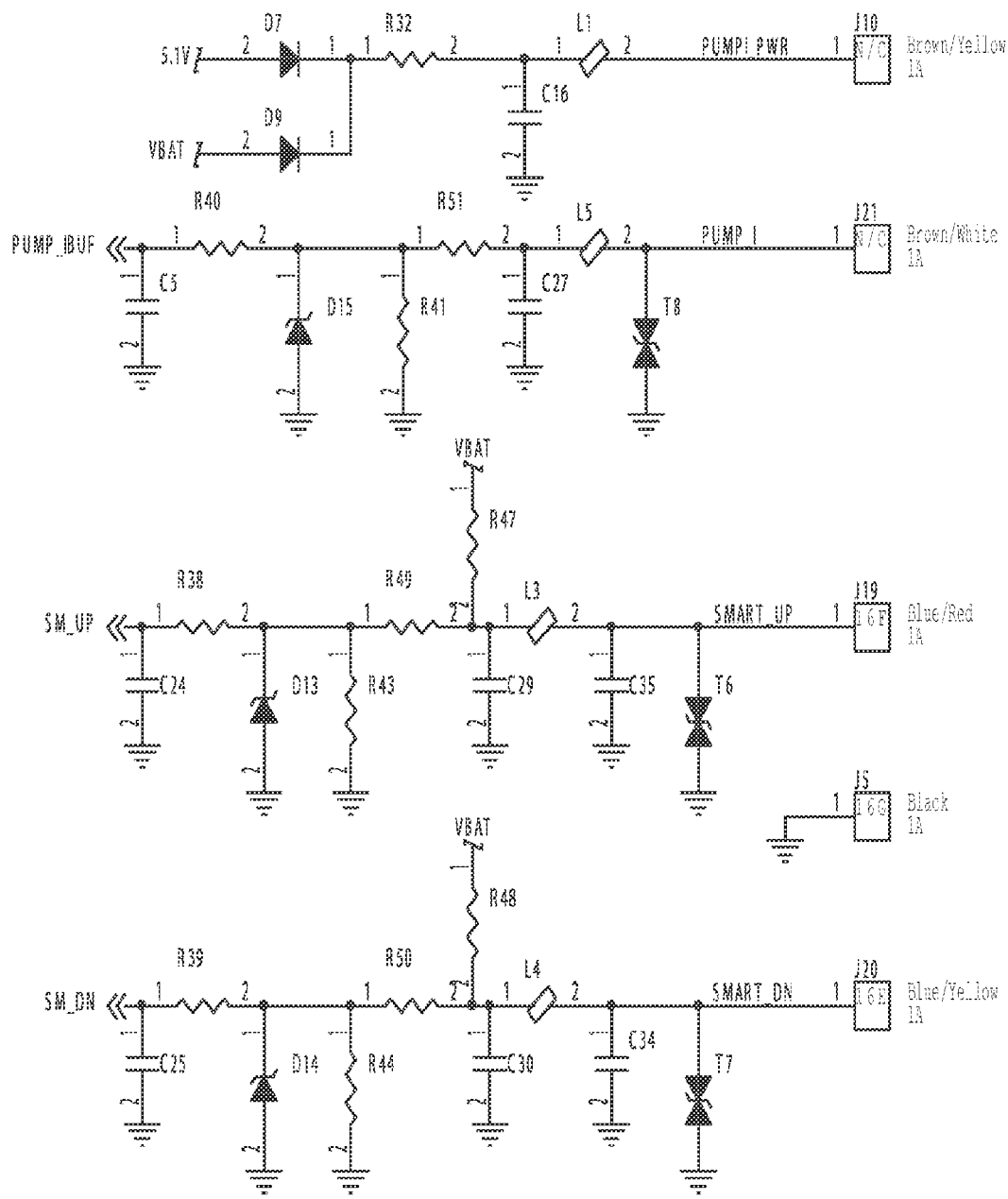
Figure 2K:
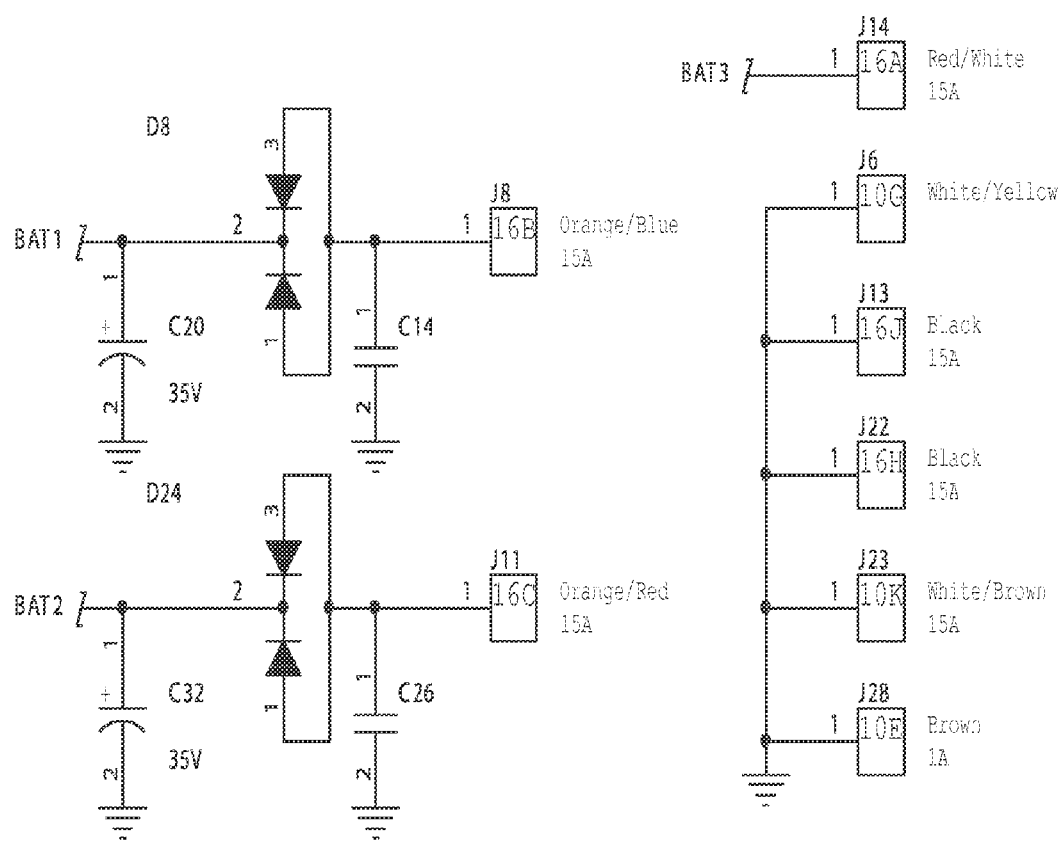

An example functional block diagram of a plow control module 12 is shown in FIG. 2A, and an example detailed electrical schematic of a plow control module 12 is shown in FIGS. 2B through 2K.

Turning to the vehicle control module 15 of FIG. 1, the vehicle control module 15 typically, but not necessarily, may be installed in the engine compartment of the vehicle. In some embodiments, the VCM 15 may be installed at or in a location on the vehicle other than the engine compartment. A vehicle harness 40 may connect the VCM 15, one or more lights 42 mounted on the vehicle (e.g., one or more of a vehicle headlight, a vehicle turn signal, a vehicle reverse light, or a vehicle daytime running lamp), and one or more user controls 45 within the cab or interior of the vehicle that are provided by the vehicle manufacturer to activate the one or more vehicle lights 42 (e.g., user controls attached to the steering column, toggle switches, touch screen, dials, switches and/or other user activated controls). The vehicle harness 40 may redirect signals generated by the user controls 45 (such as when activated, deactivated or otherwise manipulated by a user) to the VCM 15. The VCM 15 may decide, based on snow plow connection status or based on the availability of the PCM 12, whether to send the signals to the one or more vehicle lights 42 (e.g., via the vehicle harness 40 or directly), or whether to send the signals to the PCM 12. Typically, but not necessarily, when a PCM 12 is available, the PCM 12 is available to control a connected snow plow. In an embodiment, the PCM 12 may determine whether a snow plow is connected based on whether or not the PCM 12 was able to sense an electrical connection to one or more plow lights and/or plow turn signals, or the PCM 12 may determine whether a snow plow is connected based on some other suitable determination mechanism.

When the VCM 15 decides that the signals corresponding to vehicle light control (e.g., the signals corresponding to user inputs or commands received via the user controls 45) are to be sent to the PCM 12 instead of to the vehicle lights 42, the VCM 15 may transmit corresponding wireless communication signals indicating the light control commands (e.g., on, off, blinking, high or low beam, tilt, move) to the PCM 12. For example, the processor 20b of the VCM 15 may generate the corresponding wireless communication signals and may cause the signals to be transmitted to the PCM 12 via the transceiver 28b and the antenna 25b. The PCM 12 may operate one or more plow lights based on the information or commands received in the wireless communication signals from the VCM 15. In some embodiments, the VCM 15 may wait for an acknowledgement to the transmitted signals from the PCM 12.

Conversely, when the VCM 15 decides that the signals corresponding to vehicle light control are to be sent to the vehicle lights 42 instead of to the PCM 12, the VCM 15 may transmit corresponding communication signals to the vehicle lights 42.

In an embodiment, the VCM 15 may detect the availability of the PCM 12 and may base the decision of where to direct the light control signals on the availability of the PCM 12. The VCM 15 may detect the availability of the PCM 12 based on the reception of a wireless communication or message from the PCM 12, in an embodiment. For example, a PCM 12 may send a message indicating that it is available, on-line, or "alive" by sending a message sent to the VCM 15, such as a heart beat message or other suitable message. The message sent from the PCM 12 to the VCM 15 may include a status, in an embodiment. If the VCM 15 does not receive a heart beat message from the PCM 12 in a given time interval, the VCM 15 may determine that the PCM 12 is unavailable. In some embodiments, after the VCM 15 has determined the availability of the PCM 12, the VCM 15 may store an indication of the snow plow connection status, such as in memory 22b.

Based on the availability of the PCM 12, the VCM 15 may engage or disengage one or more vehicle lights 42. In an embodiment, if the VCM 15 determines that the PCM 12 is available, the VCM 15 may disengage one or more vehicle lights 42 and may cause any user commands corresponding to the operations of the disengaged lights to be sent to the PCM 12 and not to the one or more vehicle lights 42. For example, if the VCM 15 determines that the PCM 12 is available and the VCM 15 receives a command corresponding to an indication at a user control 45 to activate the high beams, the VCM 15 may forgo sending the "activate high beams" command to the vehicle headlights 42, and instead may cause a message indicating "activate high beams" to be wirelessly transmitted to the PCM 12. Upon reception of the "activate high beams" message at the PCM 12, the PCM processor 20a may cause the high beams of the snow plow headlights to be activated.

Conversely, if the VCM 15 detects that the PCM 12 is unavailable, the VCM 15 may engage (or re-engage, as the situation warrants) the one or more vehicle lights 42, and may cause any user commands corresponding to the operations of the one or more vehicle lights 42 to be sent to the one or more vehicle lights 42 and not to the PCM 12. Thus, when the PCM 12 is unavailable, the one or more vehicle lights 42 may operate as provided by the vehicle manufacturer, and the one or more corresponding snow plow lights may be disengaged.

In this manner, the VCM 15 may automatically determine a connection status of the snow plow or availability of the PCM 12, and based on the determination, the VCM 15 may automatically cause either the plow lights or the vehicle lights 42 to be operational. For example, the VCM 15 may automatically determine that the PCM 12 is available and may disengage the vehicle lights 42 so that the vehicle lights 42 are not operational and the plow lights are operational. The VCM 15 may automatically determine that the PCM 12 is unavailable and may engage or re-engage the vehicle lights 42 so that the vehicle lights 42 are operational and the plow lights are not operational.

In some embodiments, the VCM 15 may not disengage all of the vehicle lights 42, but may only disengage some of the vehicle lights 42 based on the connection status of the plow. For example, the VCM 15 may disengage the headlights of the vehicle when a snow plow is connected, but may maintain the operation of vehicle running lights and turn signals in concert with the operation of plow running lights and turn signals. In an embodiment, when all of the front vehicle lights are disengaged by the VCM 15, the rear vehicle lights (e.g., tail lights, rear turn signals, third or supplemental brake light), as well as any side minor-mounted lights such as supplemental turn signals, may remain active.

In some embodiments, the plow lights and the vehicle lights 42 may not have one-to-one correspondences. For example, a plow may not have running lights while the vehicle may have running lights. In these embodiments, the vehicle lights for which there are no corresponding plow lights may maintain operation independent of plow connection status, while vehicle lights for which there are corresponding plow lights may be moved by the VCM 15 into and out of operational states based on the plow connection status.

In an embodiment, the vehicle control module 15 may be compatible with multiple vehicle lighting systems of multiple vehicle manufacturers. For some vehicle manufacturers, though, the vehicle lighting systems may generate an error code when the VCM 15 disengages the vehicle lights 42. In these scenarios, the VCM 15 may adjust the vehicle lighting signals so that a misleading error indication is not displayed to the operator on the vehicle dash board or console.

For example, for some vehicle manufacturers, the disengagement of the vehicle headlights may normally cause an error code to be generated that indicates the presence of a burned out high-beam light bulb. When the VCM 15 disengages the vehicle high beams for snow plow lighting purposes, though, the normally generated error code may be misleading or erroneous if displayed to the operator. In this example, to prevent the misleading message from being displayed on the vehicle dash or console, the VCM 15 may direct the driver side high beam signal through a normally closed relay and a resistor pack back to the vehicle ground. A similar redirection may be performed by the VCM 15 for the passenger side. As such, the resistors may simulate the load of the high beam vehicle bulbs, thus preventing the manufacturer-provided control module for the vehicle lighting system from setting a fault code and from shutting the vehicle high beam signals off. Moreover, in the event of an actual vehicle high-beam light bulb failure, the relays may simulate a burnt out bulb. In particular, the VCM 15 may open the corresponding relay if a high beam driver or passenger bulb of the vehicle lighting burns out, thus triggering the "lamp out" warning light on the vehicle dash board. A similar procedure may be used for the low beam light bulb circuit.

Of course, the use of the above described resistive technique is not limited to only high and low beam light bulb burn-outs. When one or more vehicle lights are disengaged by the VCM 15, the appearance of any type of misrepresentative error codes on the vehicle dash or console may be thwarted by applying similar resistive circuit techniques, as desired.

In an embodiment, the vehicle control module 15 is connected to the vehicle battery and receives its power therefrom. In an embodiment, the vehicle control module 15 may control whether or not power is delivered from the vehicle battery to the plow control module 12 via the power cable 32 based on a state of the vehicle's ignition switch. For example, if the position of a vehicle's ignition switch corresponds to a state in which power is provided to the vehicle electrical systems, the VCM 15 may allow the PCM 12 to also receive power. For safety reasons, though, the PCM 12 may not be allowed to move the snow plow unless the vehicle ignition switch is in a fully-on position. Additionally or alternatively, the vehicle control module 15 may control whether or not power is delivered from the vehicle battery to the plow control module 12 via the power cable 32 based on a voltage of the vehicle battery.

Figure 3A:
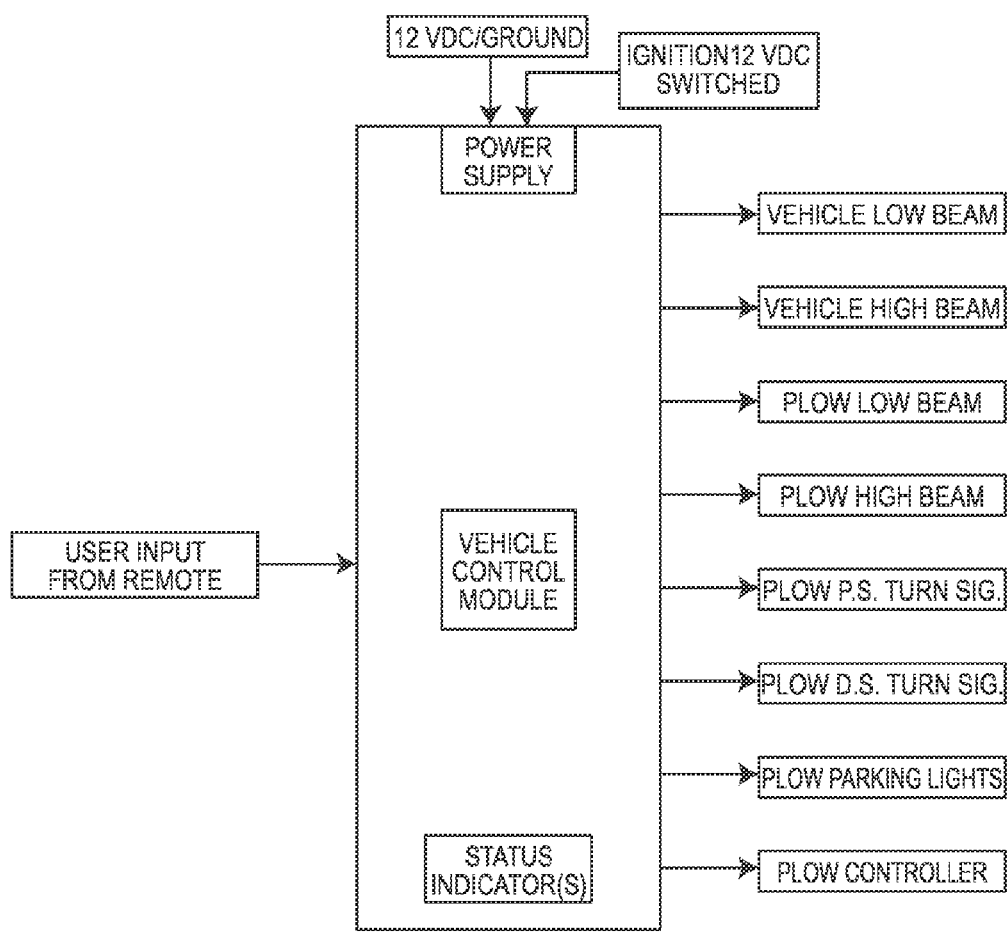
FIG. 3A is an example functional block diagram of the vehicle control module of FIG. 1.
Figure 3B:
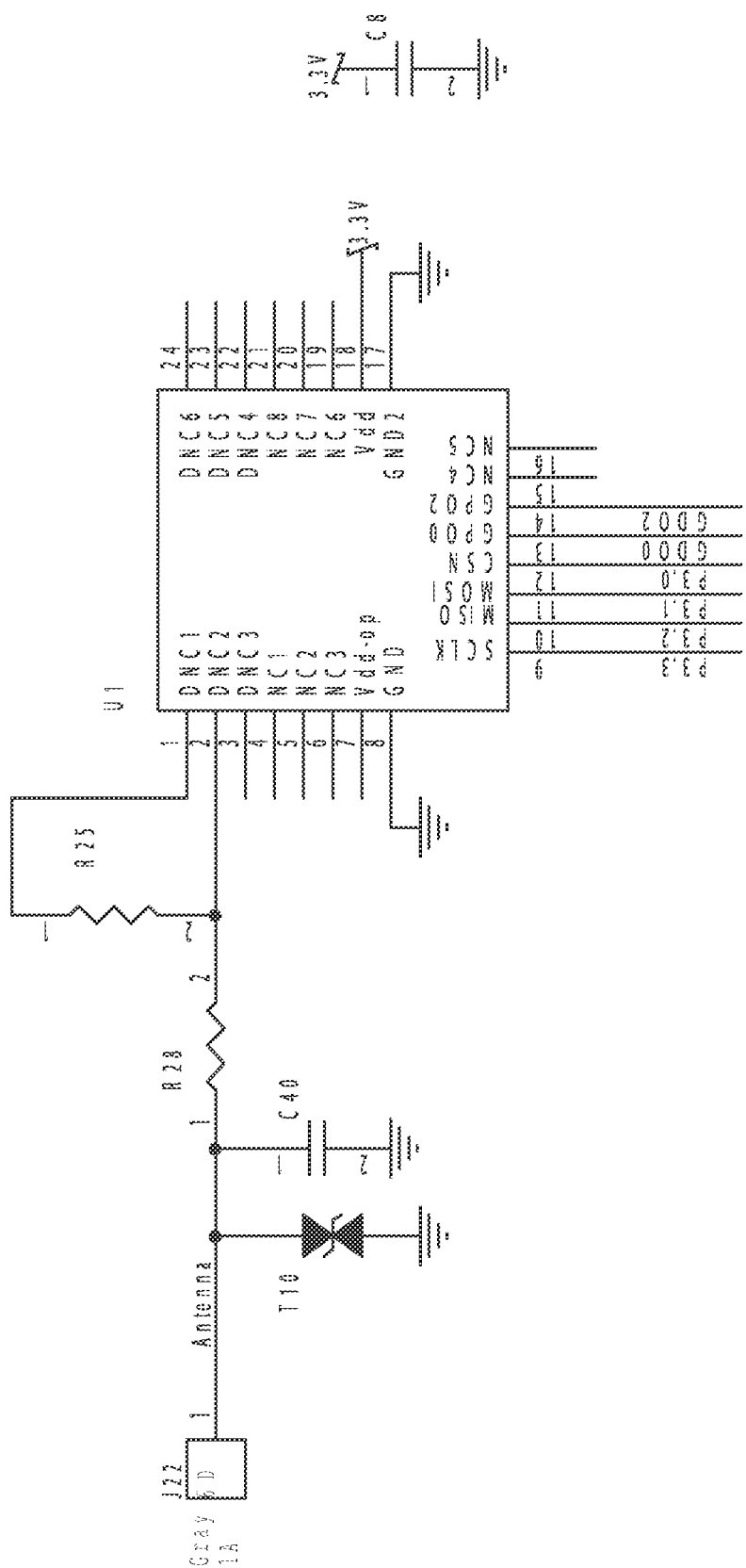
FIGS. 3B to 3J each illustrates a portion of a detailed electrical schematic of an embodiment of a vehicle control module.
Figure 3C:
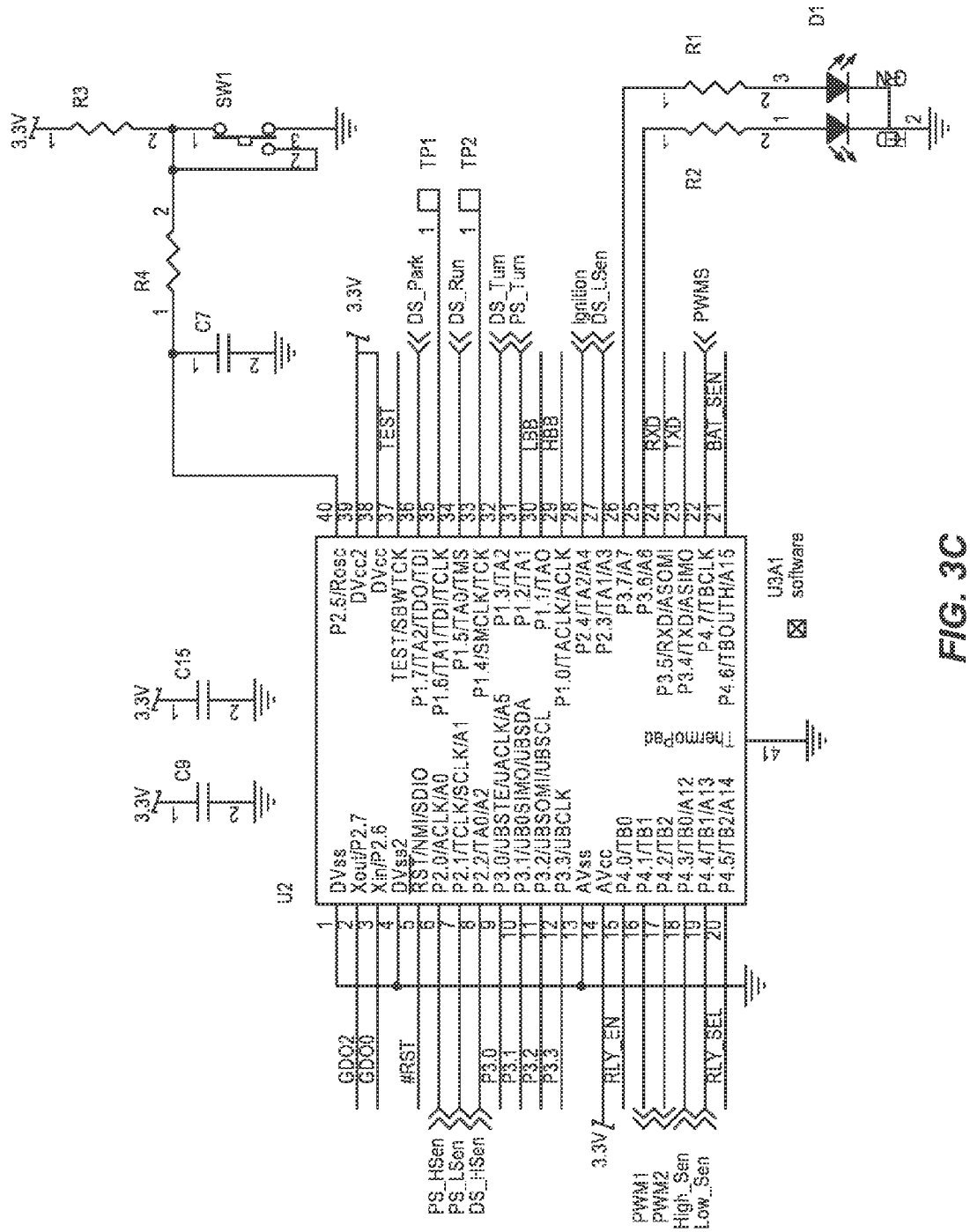
Figure 3D:
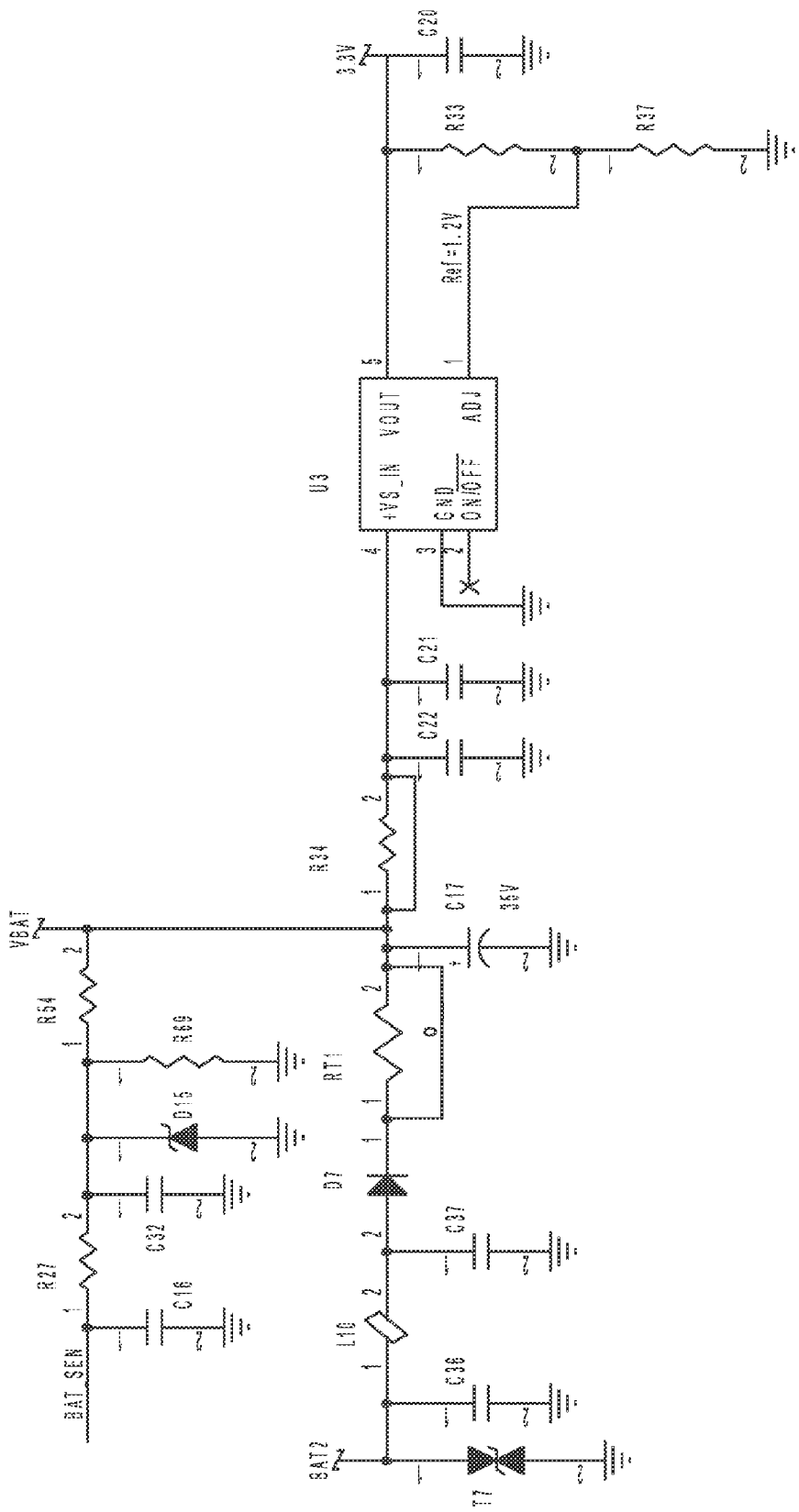
Figure 3E:
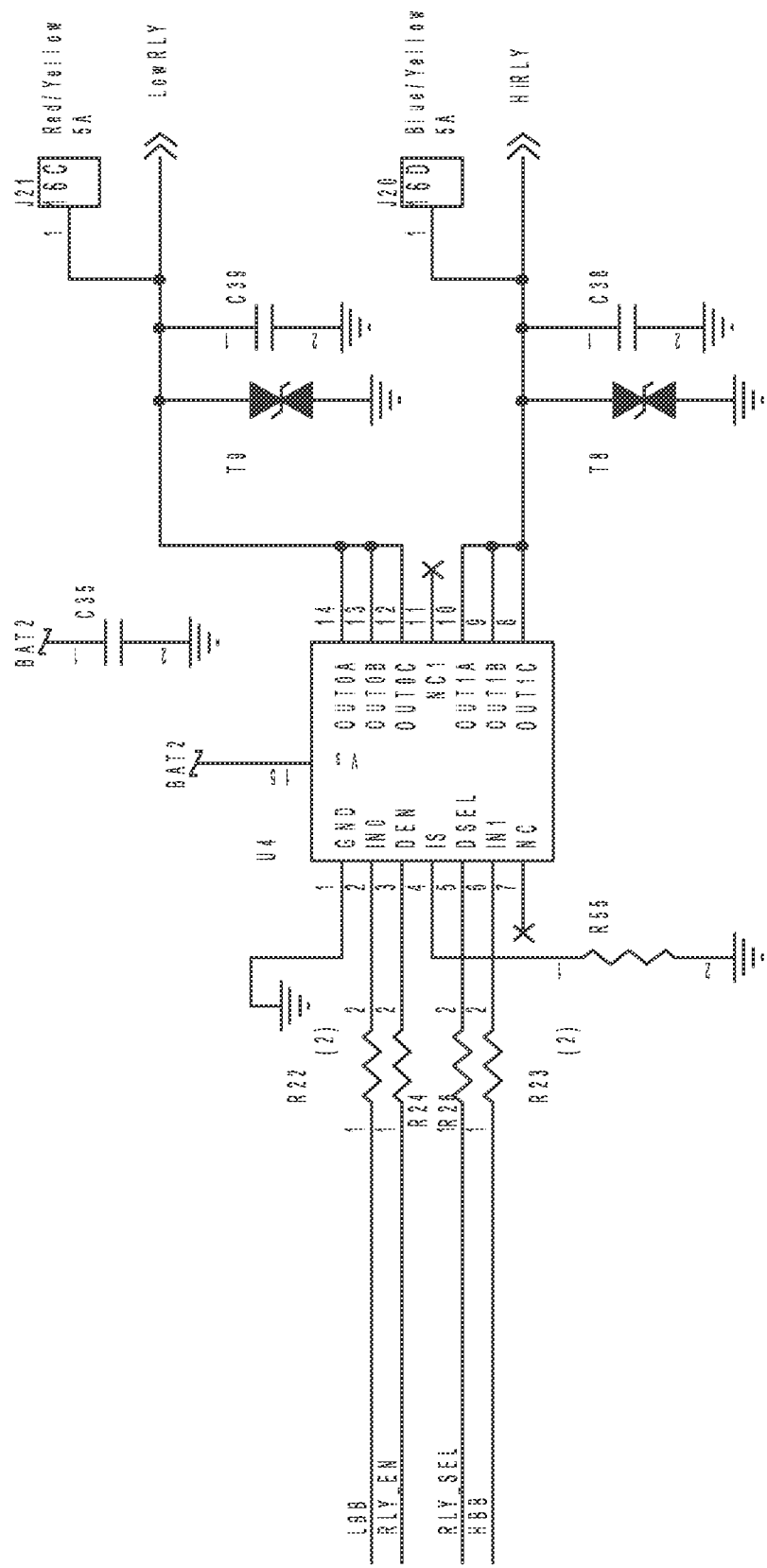
Figure 3F:
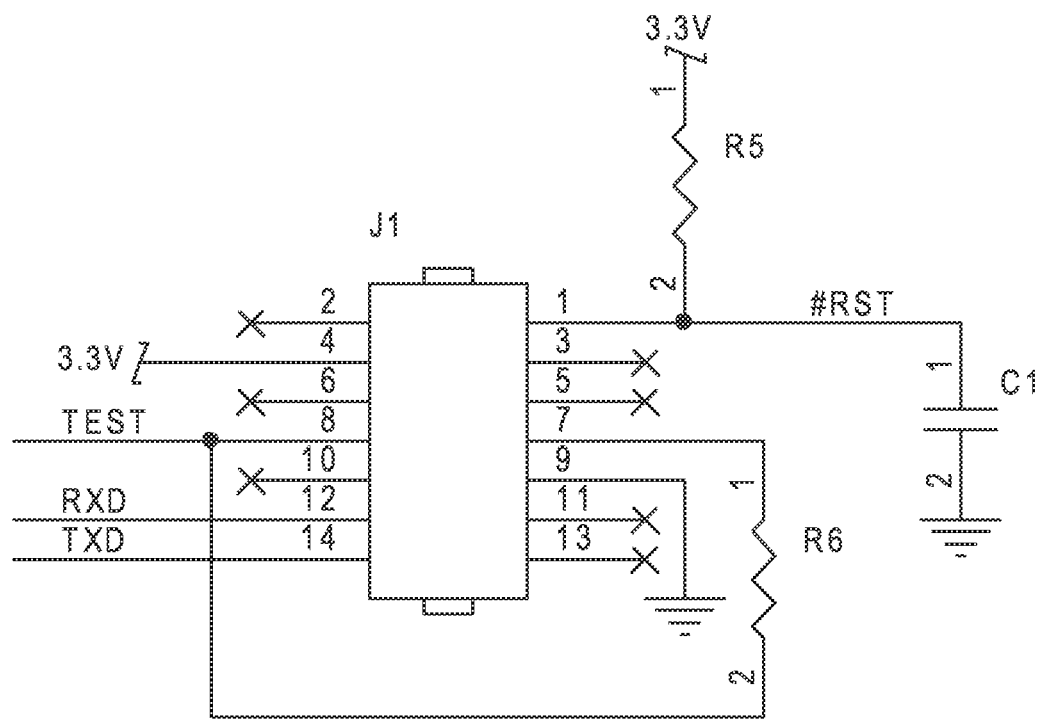
Figure 3G:
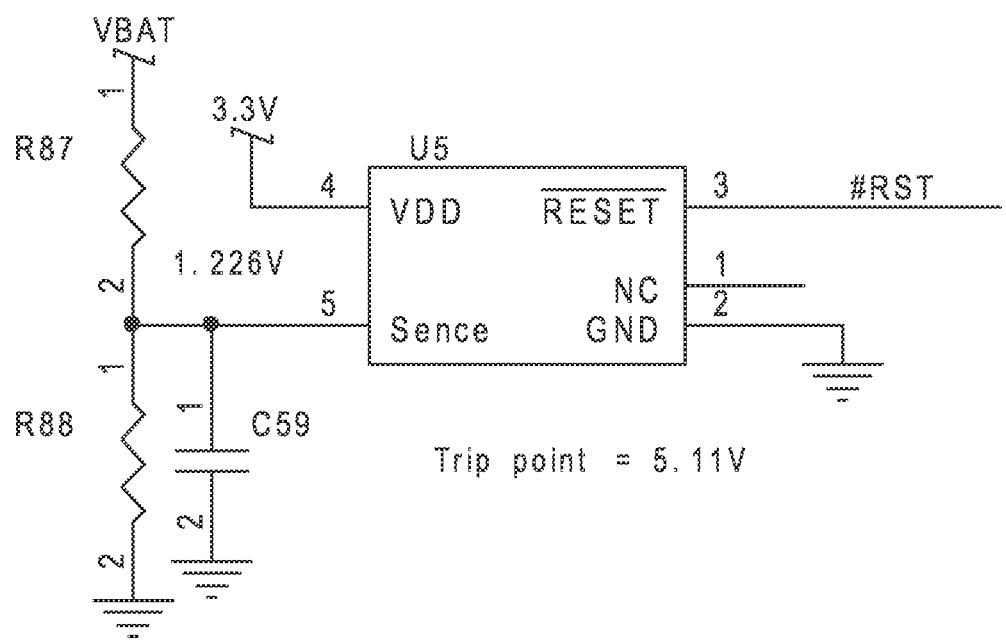
Figure 3H:
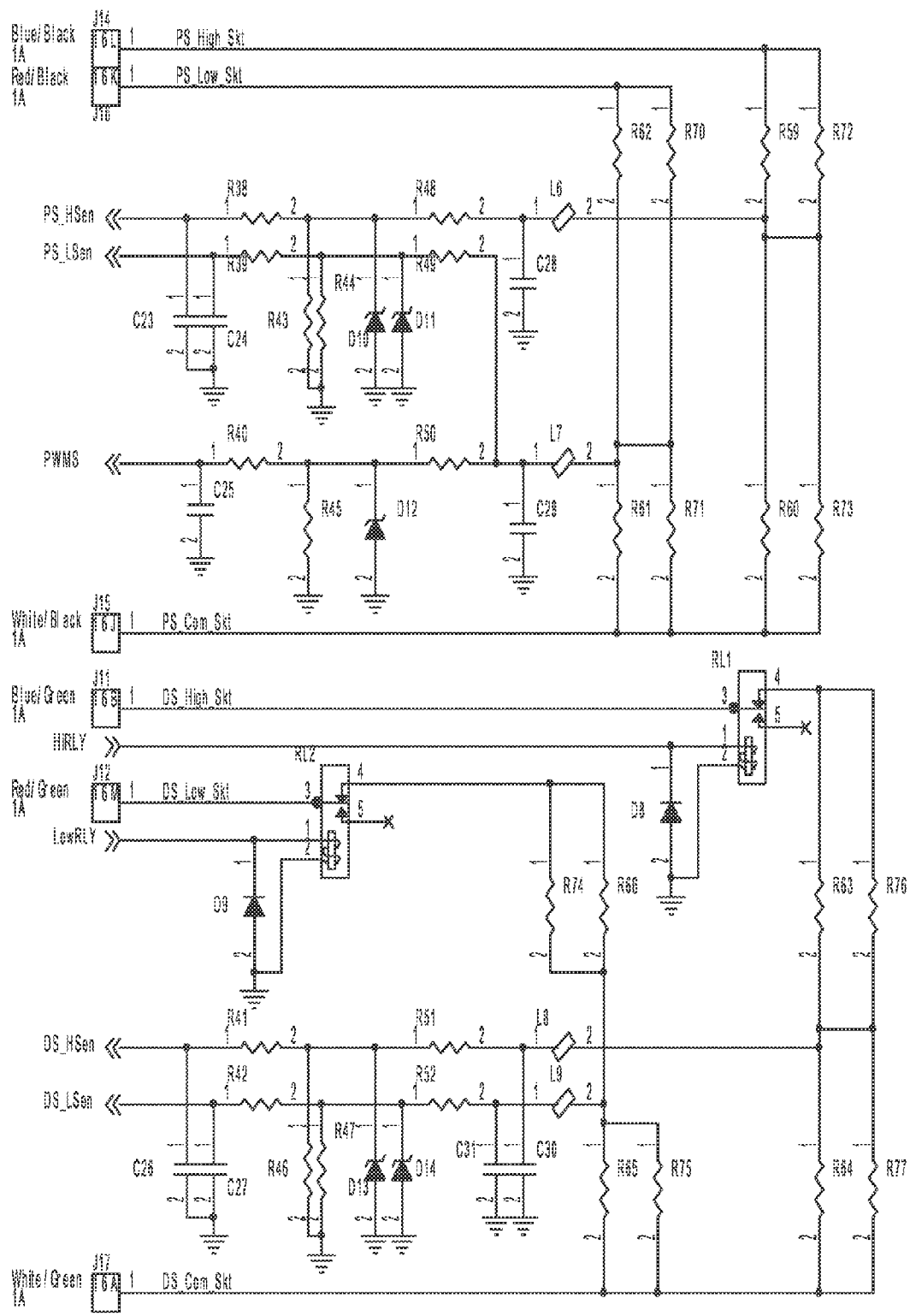
Figure 3I:
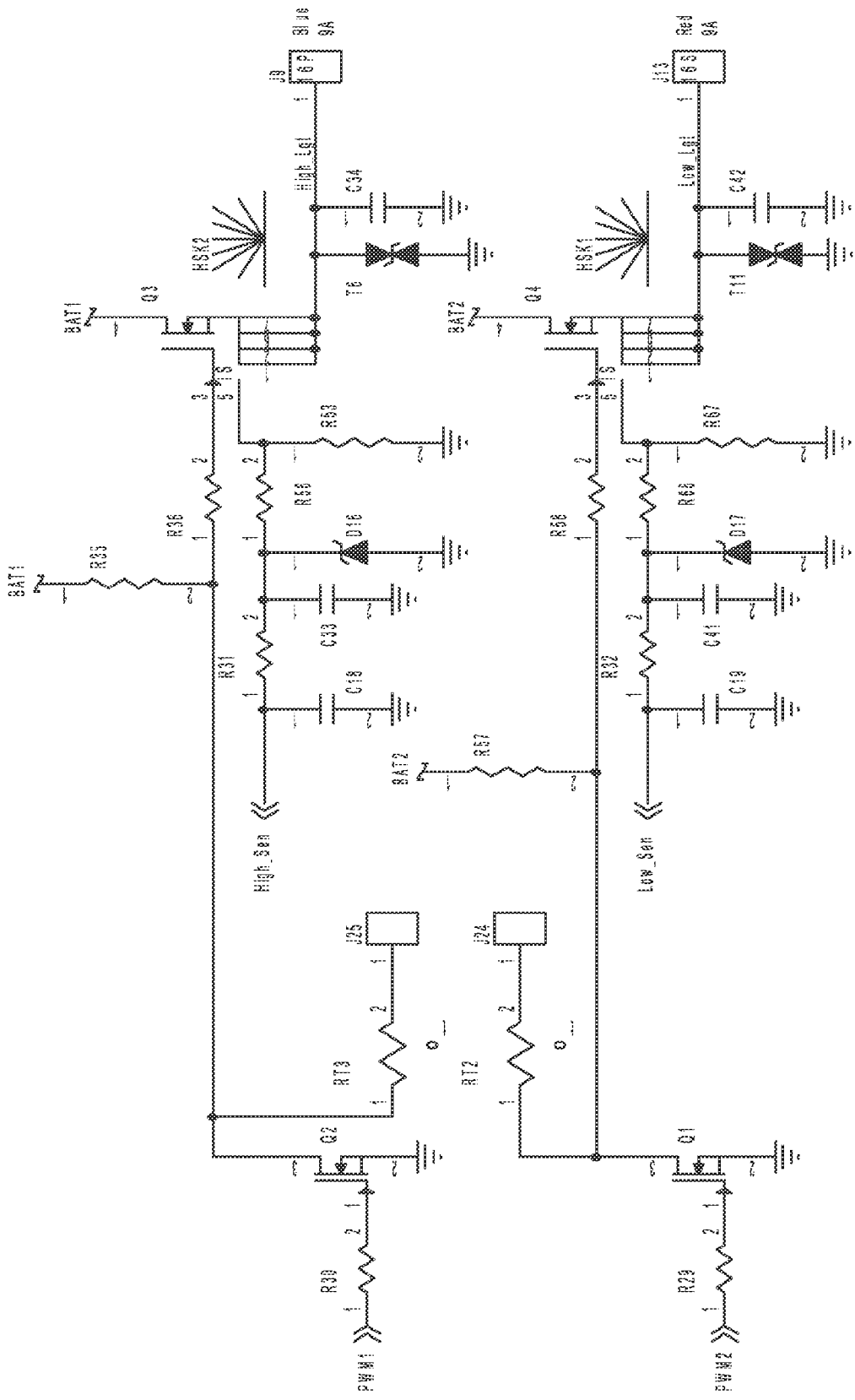
Figure 3J:
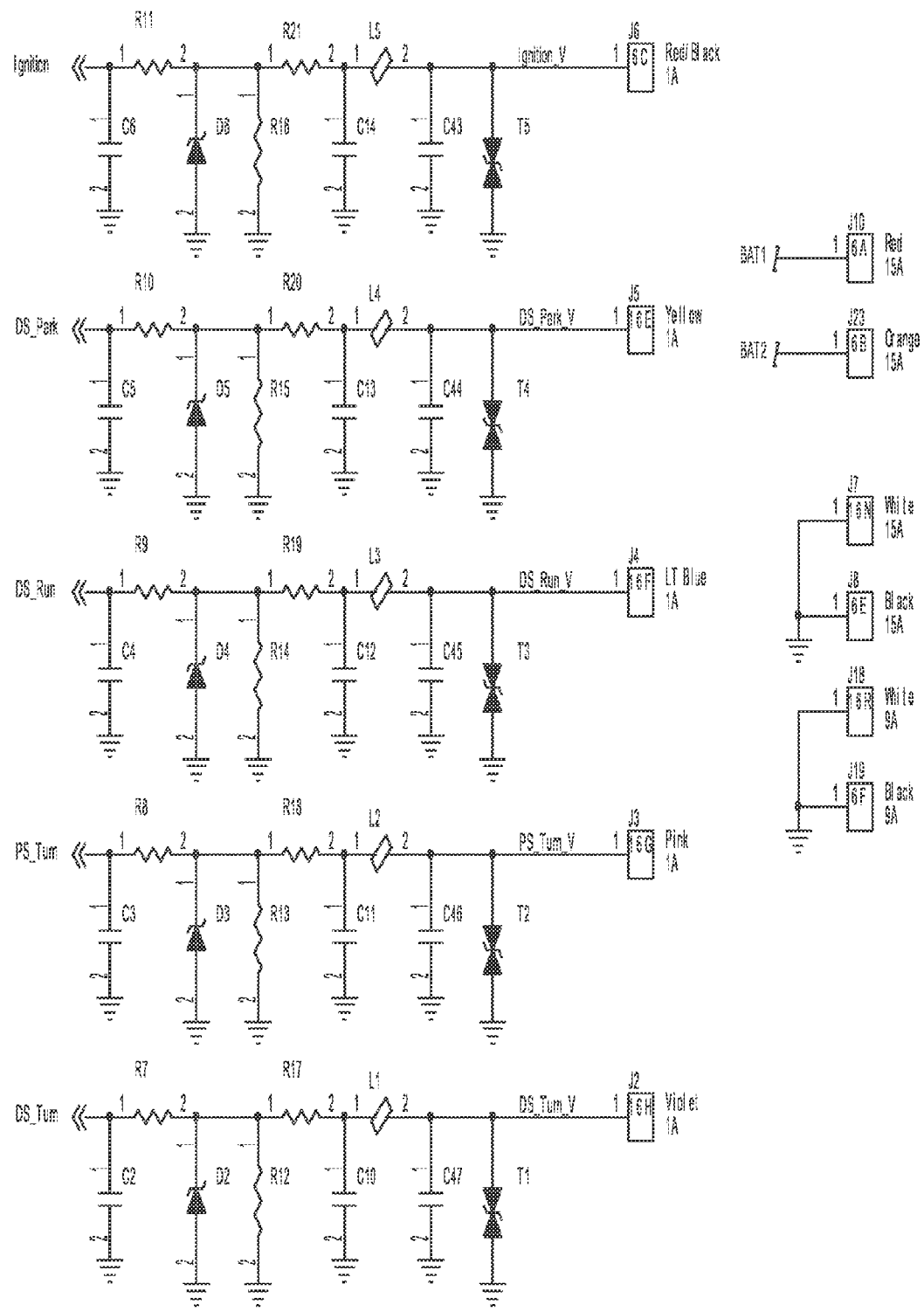

The automatic snow plow connection detection techniques and resulting operations of snow plow lights and vehicle lights described herein eliminates the need for the user activated switch of conventional systems. Using the techniques described herein, a user activated switch to control and coordinate plow light operation and vehicle light operation is no longer necessary, as the techniques described herein automatically determine a plow connection status or availability of a plow control module, and, based on the determined connection status, automatically adjust plow lights or vehicle lights to be operable. An example functional block diagram of a vehicle control module 15 is shown in FIG. 3A, and an example detailed electrical schematic of a vehicle control module 15 is shown in FIGS. 3B through 3J.

Turning now to the hand-held controller 18 of FIG. 1, the hand-held controller 18 may typically (but not necessarily) be disposed within a cab or interior of the vehicle. The hand-held controller 18 may include thereon one or more user controls 50 that correspond to various desired operations of the snow plow. The one or more user controls 50 may be of any configuration or format, such as a joystick, toggle, push-button, dial, lever, touch screen, voice-activated control, and/or any other suitable user control. At least some of the one or more user controls 50 may correspond to desired snow plow blade operations, such as raise, lower, angle right, angle left, attach, detach, tilt, scoop, vee, or straight. Upon user activation of the one or more user controls 50, the processor 20c of the hand-held controller 18 may cause corresponding wireless communications to be sent via the transceiver 28c and the antenna 25c to the plow control module 12 to control operations of the snow plow. In some embodiments, the hand-held controller 18 may wait for an acknowledgement from the PCM 12 to the transmitted commands.

Figure 4A:
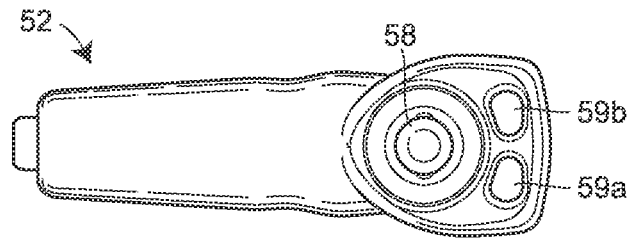
FIG. 4A is a top view of an example embodiment of the hand-held controller of FIG. 1.
Figure 4B:
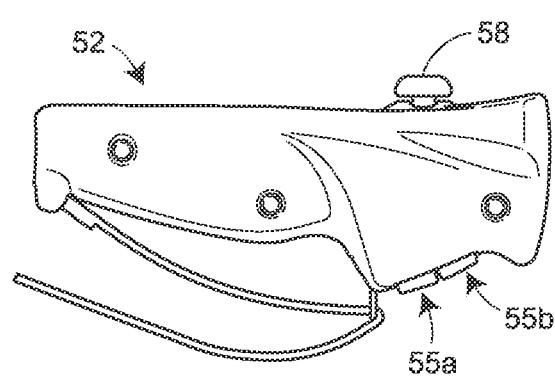
FIG. 4B is a right side plan view of the hand-held controller of FIG. 4A.
Figure 4E:
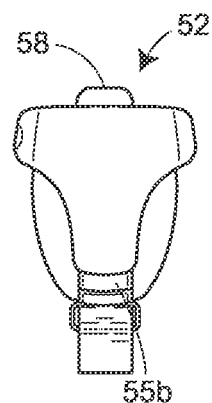
FIG. 4E is a front view of the hand-held controller of FIG. 4A.
Figure 4C:
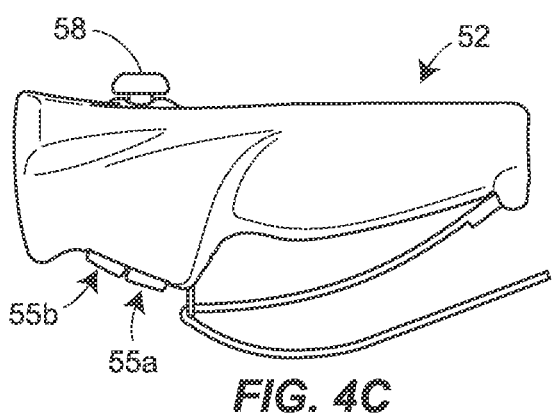
FIG. 4C is a left side plan view of the hand-held controller of FIG. 4A.
Figure 4F:
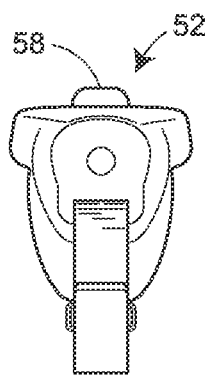
FIG. 4F is a rear view of the hand-held controller of FIG. 4A.
Figure 4D:
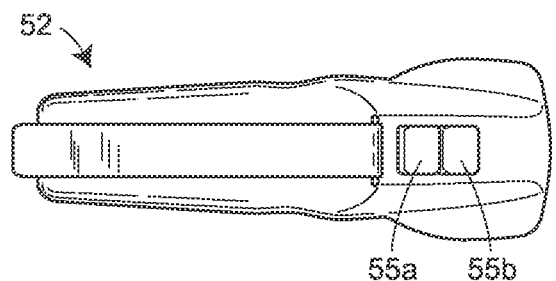
FIG. 4D is a bottom view of the hand-held controller of FIG. 4A.

One example embodiment 52 of the hand-held controller 18 is shown in FIGS. 4A-4G. FIG. 4A is a top view of the example embodiment 52 of the hand-held controller of FIG. 1, FIG. 4B is a right side plan view of the hand-held controller 52, and FIG. 4C is a left side plan view of the hand-held controller 52. FIG. 4D is a bottom view of the hand-held controller 52, FIG. 4E is a front view of the hand-held controller 52, and FIG. 4F is a rear view of the hand-held controller 52.

The example hand-held controller 52 includes, among other features, a trigger arrangement 55a, 55b to control plow lift and lower functions. The triggers 55a, 55b may be disposed on the hand-held controller 52 so as to be easily operable by an operators' fingers, e.g., on the underside of the remote or some other suitable location. Although the trigger arrangement shown in FIGS. 4A-4F includes two separate triggers 55a, 55b, any number of triggers (e.g., one trigger, three triggers, or any suitable number of triggers) may be used in accordance with the principles and techniques of disclosure The example hand-held controller 52 of FIGS. 4A-4F also includes a joystick 58 to control other plow movements. In an embodiment, the joystick 58 may be disposed on the hand-held controller 52 so as to be easily operable by an operator's thumb, e.g., on the topside of the remote or some other suitable location.

The example hand-held controller 52 of FIGS. 4A-4F further includes two buttons 59a and 59b disposed proximate to the joystick 58. In an embodiment, the button 59a may power on and power off the hand-held controller 52, and the button 59b may control downward pressure to the snow plow blade. Of course, the buttons 59a and 59b need not be disposed as shown in FIGS. 4A-4F, but may be disposed in any suitable location on the hand-held controller 52.

Figure 4G:
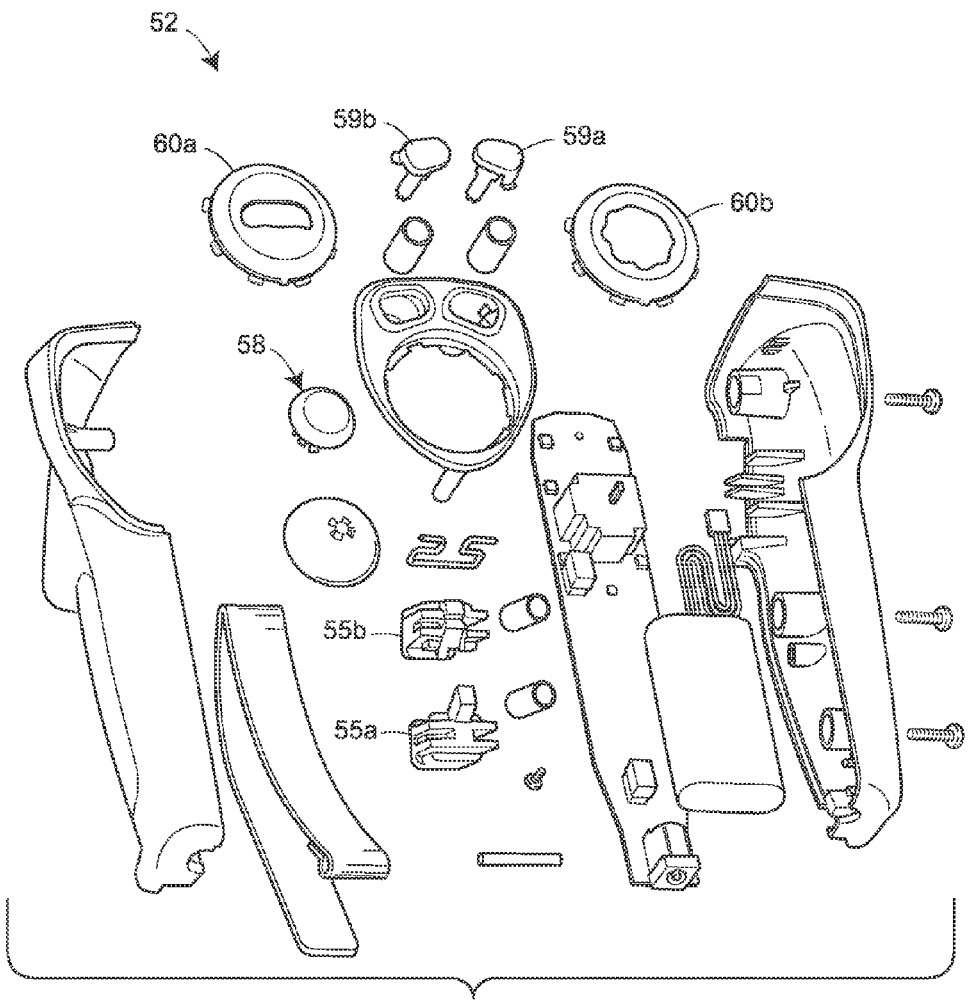
FIG. 4G is an exploded view of the hand-held controller of FIG. 4A.

FIG. 4G includes an exploded view of the hand-held controller 52 of FIGS. 4A-4F. The hand-held controller 52 may include a bezel (such as bezel 60a or bezel 60b) that may be permanently or removably attached to the hand-held controller 52. Each particular bezel 60a, 60b may correspond to a particular plow type. For example, the bezel 60a may correspond to a straight blade snow plow, and the bezel 60b may correspond to a V-blade snow plow. A bezel 60a or 60b that is attached to the remote 52 may limit the movement of the joystick 58 to match the operational abilities of the corresponding snow plow. For example, the bezel 60b corresponding to a V-blade plow may allow the joystick 58 to move in the 12:00 direction, which may, in an embodiment, correspond to a command to move the blades of a V-blade plow to a scoop orientation. On the other hand, the bezel 60a corresponding to a straight-blade plow may not allow the joystick 58 to move in the 12:00 direction as the single blade of a straight-blade plow cannot be oriented in a scoop fashion. Of course, the hand-held controller 52 is not limited to operating with only two different types of bezels 60a, 60b corresponding to only two different snow plow types. Any number of bezels corresponding to any number of snow plow types may be used in conjunction with the hand-held controller 52.

In an embodiment, the hand-held controller 18 may be self-powered by a battery or some other power source contained within the hand-held controller 18. In an embodiment, the hand-held controller 18 may be powered by an external source such as a 12 volt power source or some other power source resident on the vehicle.

With regard to the wireless communications between the PCM 12, the VCM 15 and the hand-held controller 18, each of the units (i.e., the PCM 12, the VCM 15 and the hand-held controller 18) may communicate wirelessly with any of the other units. Any known and suitable wireless communication protocol and/or spectrum may be used for wireless communications between the three units, for example, Infrared (IR), Radio Frequency (RF), microwave, BLUETOOTH®, Wi-Fi, a private wireless communication protocol, and/or a private wireless communications spectrum. In an example embodiment, the wireless communications between the three units 12, 15 and 18 may be transmitted and received in a frequency range of 902-928 MHz using the A1101R09A FCC &IC certified radio module by ANAREN® that incorporates the Texas Instruments CC1101 transceiver chip. In another example embodiment, the wireless communications between the three units 12, 15 and 18 may be transmitted and received in a frequency range of 865-868 MHz using the A1101R08A ETSI (European Telecommunications Standards Institute) compliant radio module by ANAREN® that incorporates the Texas Instruments CC1101 transceiver chip.

Each unit 12, 15 and 18 is capable of operating in conjunction with multiple different instances of the other units at different times. For example, a particular PCM A may be capable of operating in conjunction with each of VCM A, VCM B, or VCM C at different points in time. Similarly, VCM A may be capable of operating in conjunction with each of PCM A, PCM B, or PCM C at different points in time. Still similarly, hand-held controller A may be capable of operating in conjunction with each of VCM A, VCM B, or VCM C at different points in time, and may be capable of operating with each of PCM A, PCM B, or PCM C at different points in time. To enable control of a snow plow with a particular wireless snow plow control system including a particular PCM 12, a particular VCM 15 and a particular hand-held controller 18, the particular units of the wireless snow plow control system may be synchronized to work exclusively with each other. Typically, the synchronization procedure may be performed at a factory, prior to releasing the units 12, 15, and 18 of the wireless snow plow control system 10 to a dealer or to an end-user. The following sections describe an embodiment of a synchronization procedure between a specific PCM 12, a specific VCM 15 and a specific hand-held controller 18.

Each of the units 12, 15 and 18 may be identified by a unique identifier, such as a hex-code identifier, a serial number, or other suitable unique identifier. The unique identifier may provide an indication of a type of the unit, i.e., whether the unit is a PCM, a VCM or a hand-held controller 18.

Each of the specific units 12, 15, 18 of the wireless snow plow control system 10 may be capable of entering a synchronization mode during which synchronization with the other units may take place. When a unit is in the synchronization mode, typically any normal snow plow control (whether operational, lighting or both) may be disabled or prevented. In an embodiment, each unit 12, 15 and 18 may have a user control thereon to allow an operator or a user to direct the unit to enter the synchronization mode. For example, as shown in FIG. 1, the PCM 12, the VCM 15 and the hand-held controller 18 may each include a respective synchronization user control 65a, 65b and 65c.

Additionally, each unit 12, 15 and 18 may have a respective indication thereon (e.g., one or more status lights or light emitting diodes (LEDs), an alpha-numeric screen, or other suitable user interface) to indicate a respective mode of the respective unit to an operator. As shown in the example embodiment of FIG. 1, the PCM 12, the VCM 15 and the hand-held controller 18 may each include a respective status indicator 68a, 68b and 68c. The status indicator 68a, 68b, 68c may indicate that the unit is in a synchronization mode, an operational mode, an initialization mode, an error mode, or some other mode. Although the user interfaces of the units 12, 15 and 18 (e.g., 65a-65c, 68a-68c, 50) are illustrated in FIG. 1 as being separate user interfaces, any number of user interfaces may be combined into a single entity. For example, at the hand-held controller 18, a single touch screen user interface may incorporate the plow operation controls 50, the synchronization control 65c and the status indicator 68c.

To synchronize the three specific units 12, 15 and 18, an operator, user or robot may activate each unit's synchronization user control 65a-65c to cause the respective unit to enter a synchronization state. The synchronization state may be reflected on the status indicator 68a-68c. For example, if the status indicator 68a-68c is an LED, the LED may change color or may blink to indicate that the unit is in the synchronization state. While any of the three units 12, 15, 18 is in the synchronization state, operation of the snow plow may be disabled or prevented. Typically, but not necessarily, synchronization of the three specific units is performed at the factory prior to delivering the control system 10 to a dealer or end-user.

When a specific unit enters or is in the synchronization state, the specific unit may automatically attempt to synchronize with the other units. In an embodiment, the unit may automatically broadcast a message including the unit's unique identification. The unique identification may indicate not only the identification of the specific unit, but may also indicate the type (i.e., PCM, VCM or hand-held controller) of the specific unit. When a specific unit enters or is in the synchronization state, the unit may also automatically listen for a broadcasted message from the other two types of units. For example, when a PCM 12 enters the synchronization state, it may broadcast a message including the PCM's unique identification and type, and/or the PCM 12 may listen for a broadcasted identification message from a VCM 15 and for a broadcasted identification message from a hand-held controller 18. Upon reception of a broadcasted message from one of the other two types of units, the identification and type of unit provided in the broadcasted message may be stored at the receiving unit. The receiving unit may acknowledge the reception of the broadcasted message to the transmitting unit. For example, when the PCM 12 receives a message broadcasted from a VCM 15, the PCM 12 may store the unique identification of the VCM 15 in the memory 22a of the PCM 12, and may acknowledge the receipt of the broadcasted message to the VCM 15.

When all three types of units 12, 15 and 18 have sensed each other (e.g., when each unit has completed a broadcast/acknowledge sequence with each of the other two types of units), each unit may have stored unique identifications corresponding to the other two types of units within its local memory. The unique identifications of the three units may be used to address and process wireless communications, packets or messages that are sent and received between the three units. As such, after synchronization, a private wireless communication network between the three units 12, 15 and 18 may have been effectively established. At this point, each of the three units 12, 15 and 18 may enter an operational state to control the operations of the snow plow. The operational state may be reflected on the status indicator 68a-68c, in an embodiment. For example, if the status indicator 68a-68c is an LED, the LED may change to another color or may change its blinking rate to indicate that the unit is in the operational state.

In an embodiment, each of the three units may automatically enter the operational state only upon successful synchronization with the other two units. In another embodiment, each of the three units may enter the operational state only after the operator, user, or robot has activated the corresponding synchronization user control 65a-65c to cause the respective unit to enter the operational state. When the three units 12, 15 and 18 are all mutually synchronized and are all in the operational state, the hand-held controller 18 may be prevented from controlling other snow plows (i.e., snow plows mounted on other nearby vehicles or trucks) accidentally.

As a safety measure, the snow plow may not operate when any of the three units is not in the operational state, and/or when three-way synchronization is not present. The wireless snow plow control system may monitor the presence of the three-way synchronization during steady-state operation by using various communication protocols between its units. A first wireless communication protocol may be employed between the VCM 15 and the PCM 12. In an embodiment, the VCM 15 may transmit a periodic "heart beat" message to the PCM 12 and the PCM 12 may acknowledge the VCM 15 indicating the reception of the heart beat message, and/or the PCM 12 may transmit a periodic "heart beat" message to the VCM 15 and the VCM 15 may acknowledge the PCM 12. The heart beat message and acknowledgement may be of any suitable format. In an embodiment, the heart beat message may pertain to status information. For example, the heart beat message transmitted by the VCM 15 may be a request for plow light status, and the PCM 12 may respond with an acknowledgement including the plow light status. If an acknowledgement from the PCM 12 is not received at the VCM 15 within a specific time interval, the VCM 15 may infer that the three-way synchronization has been lost and/or that the snow plow is no longer connected. The VCM 15 may then take corresponding action (e.g., re-engage vehicle lights, inform the operator via a user interface, or some other suitable action).

In some scenarios, an acknowledgement including the plow light status may be successfully received at the VCM 15, but the contents of the plow light status may indicate a fault or error has occurred. For example, the plow light status may indicate that a particular bulb is burned out. The VCM 15 may forward this information to the hand-held controller 18, and the hand-held controller may indicate the fault or error to the operator, e.g., via a user interface at the hand-held controller 18.

Another wireless communication protocol may be employed between the hand-held controller 18 and the PCM 12 to aid in the monitoring of the presence of the three-way synchronization. In an embodiment, the hand-held controller 18 may transmit a periodic "heart beat" message to the PCM 12, and/or the PCM 12 may transmit a periodic "heart beat" message to the hand-held controller 18. In a manner similar to the VCM 15/PCM 12 heart beat, the PCM 12 may acknowledge the hand-held controller 18 indicating the reception of the heart beat message. The heart beat message and acknowledgement may be of any suitable format and may contain status information. In an embodiment, the heart beat message transmitted by the hand-held controller 18 may be a request for plow light status, and the PCM 12 may respond with an acknowledgement including the plow light status.

If an acknowledgement from the PCM 12 is not received at the hand-held controller 18 within a specific time interval, the hand-held controller 18 may send the heart beat message to the VCM 15 for retransmission or forwarding to the PCM 12, in an embodiment. The VCM 15 may forward any acknowledgement it receives from the PCM 12 back to the hand-held controller 18. In this manner, the wireless snow plow control system 10 may include a redundant or back-up communication channel between the hand-held controller 18 and the PCM 12 to provide robustness and redundancy. For example, if wireless communications between the plow control module 12 and the hand-held controller 18 are temporarily disrupted due to interference or some other factor, rather than shutting down the entire system 10, communications may simply be transmitted between the PCM 12 and the remote controller 18 via the vehicle control module 15. Indeed, as the VCM 15 may typically be in closer proximity to the plow control module 12 than is the hand-held controller 18, the two-phase wireless communication channel between the VCM 15 and the PCM 12 and between the VCM 15 and the hand-held controller 18 may be less prone to interference and other degrading factors as compared to the single wireless communication channel between the hand-held controller 18 and the PCM 12. In some embodiments, the antenna 25b of the VCM 15 may be at least partially routed into the cab or interior of the vehicle to improve the quality of the wireless communication channel between the VCM 15 and the hand-held controller 18.

In an embodiment of the wireless snow plow control system 10, the status indicators 68a-68c may be LEDs which are capable of displaying different colors and are capable of blinking at different rates to indicate various statuses of the three units 12, 15 and 18. A chart describing an embodiment of interactions and relationships between the manipulations of the synchronization controls 65a-65c of each unit 12, 15, and 18, corresponding indications at the LEDs 68a-68c, and corresponding actions of each unit 12, 15, 18 is provided in FIGS. 5A and 5B.

In the wireless snow plow control system 10, in an embodiment, the vehicle control module 15 may be capable "out-of-the-box" of operating with any snow plow type, e.g., straight-blade, V-blade, V-blade with wings, etc. That is, no configuration or other customization of the VCM 15 is necessary in order for the VCM 15 to operate different types of snow plows. Indeed, in a typical embodiment, the VCM 15 may be ignorant of snow plow type and may not make any software decisions or take any specific actions at all based on snow plow type.

The hand-held controller 18 of the wireless snow plow control system 10 may be essentially ignorant of snow plow type, in an embodiment. For example, software or instructions stored on the memory 22c of the hand-held controller 18 may be ignorant of snow plow type and may not make any decisions based on snow plow type. Any customization of hand-held controller 18 behavior based on snow plow type, though, may be mechanically effected by the specific bezel 60a, 60b which is externally and physically attached to the hand-held controller 18 in a manner such as previously described above. In embodiments where a particular bezel 60a, 60b is fixedly attached to the hand-held controller 18 "out-of-the box" from the factory, the hand-held controller 18 may be physically configured for the snow plow type or types corresponding to the particular bezel, and the out-of-the-box configuration may remain static. In embodiments where an "out-of-the-box" bezel may be removed and replaced with another bezel (e.g., by a dealer or by an end user), the type of bezel attached to the hand-held controller 18 may dictate the suite of control commands that particularly corresponds to the respective snow plow type or types. Thus, the configuration of the hand-held controller 18 may be changed via mechanical means to support various snow plow types.

The plow control module 12 of the wireless snow plow control system 10 may be capable of operating any type of snow plow. That is, the PCM 12 may include sufficient physical ports to connect with various valve configurations of various snow plow types (e.g., see FIG. 2A). Furthermore, computer-executable instructions stored on the memory 22a of the PCM 12 may include instructions to operate the various snow plow types. In an embodiment, the PCM 12 may be configured "out-of-the-box" for operating a default snow plow type. In particular, a default value of a snow plow type indicator stored in the memory 22a of the PCM 12 may be set to the default type (e.g., a straight-blade snow plow). To effect operations of the snow plow, the processor 20a may execute a subset of the instructions stored on the memory 22a based on the value of the snow plow type indicator.

To change the PCM 12 to support operations of a type of snow plow other than the default (e.g., a V-blade, V-blade with wings, or other type), an operator or user may activate or manipulate the synchronization control 65a on the PCM 12 to indicate the desired type of plow, in an embodiment. For example, if the synchronization control 65a is a touch screen, the operator or user may indicate the desired plow type by selecting one of several displayed options. In another example, the synchronization control 65a may be used in conjunction with the status display 68a to allow the user to indicate a desired plow type. For instance, if the synchronization control 65a is a button and the status display 68a is an LED, a length of time that the button is held down may indicate to the PCM 12 that the user desires to select a plow type. The PCM 12 may change the LED color and/or blink rate to indicate to the user that the PCM 12 is ready to receive the user selection. The user may then indicate his or her selection of snow plow type by entering a corresponding number and/or duration of pulses of the button, in an embodiment. A changed LED color and/or blink rate may indicate that the PCM 12 has received the desired snow plow type selection. In yet another example, the synchronization control 65a may be a toggle switch to indicate changing between two different types of snow plows.

Upon reception of the indication of the desired snow plow type selection, the PCM 12 may update the snow plow type indicator stored in its local memory 22a from the default type to the desired type. Subsequently, to properly operate the desired snow plow type, the processor 20a may execute a different subset of instructions stored on the memory 22a based on the updated value of the snow plow type indicator.

Figure 6A:
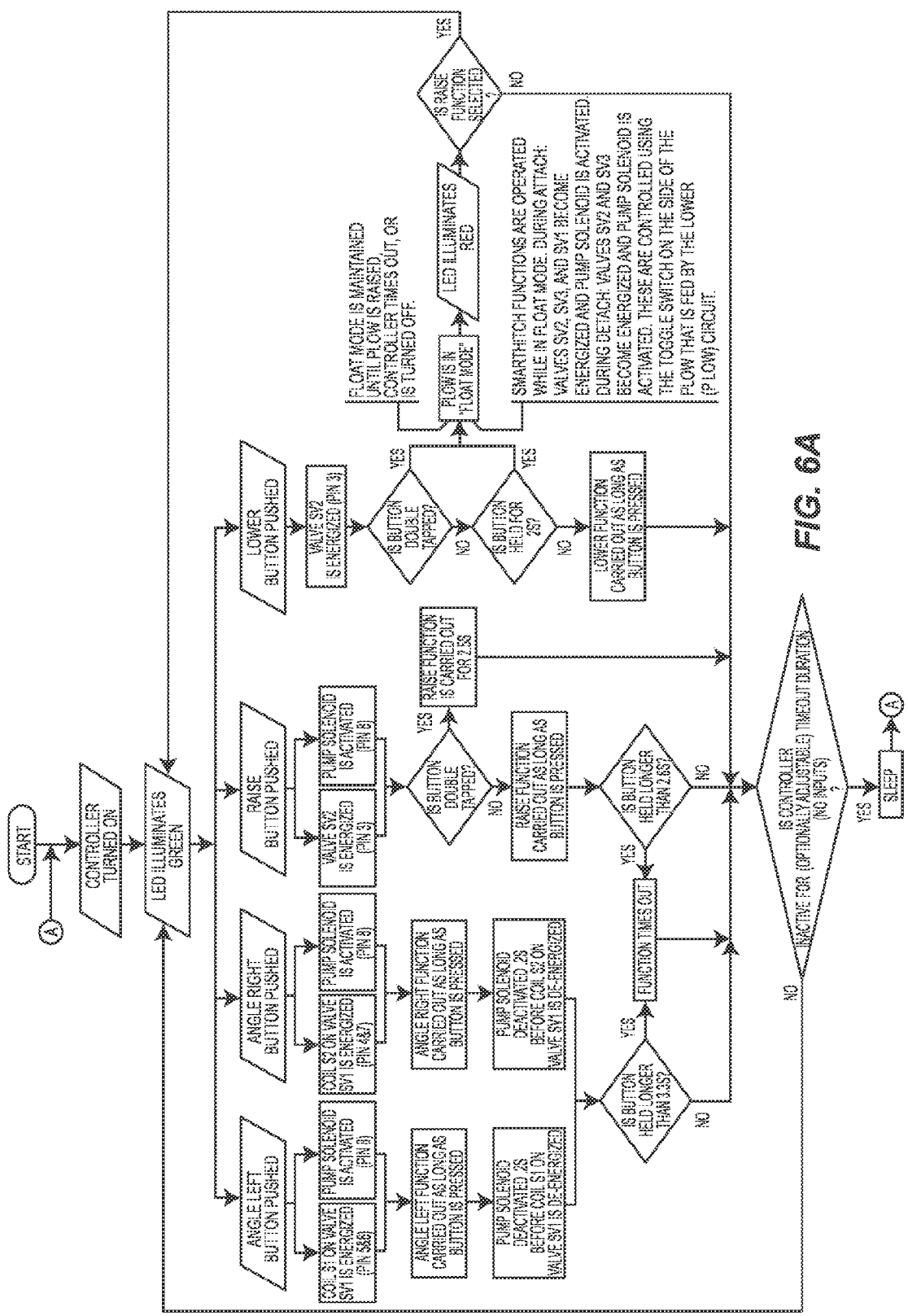
FIG. 6A illustrates an example flow chart of actions that may be taken by the wireless snow plow system of FIG. 1 to control a straight-blade snow plow.

FIG. 6A illustrates an example flow chart of actions that may be taken by the wireless snow plow system 10 to control a straight-blade snow plow when various user controls are activated or not activated (e.g., time-out) at the hand-held controller 18. The flows shown in FIG. 6A may apply to a hand-held controller 18, a PCM 12 and a VCM 15 that are synchronized for operation and are "out-of-the-box" capable of supporting a straight-blade snow plow.

Figure 6B:
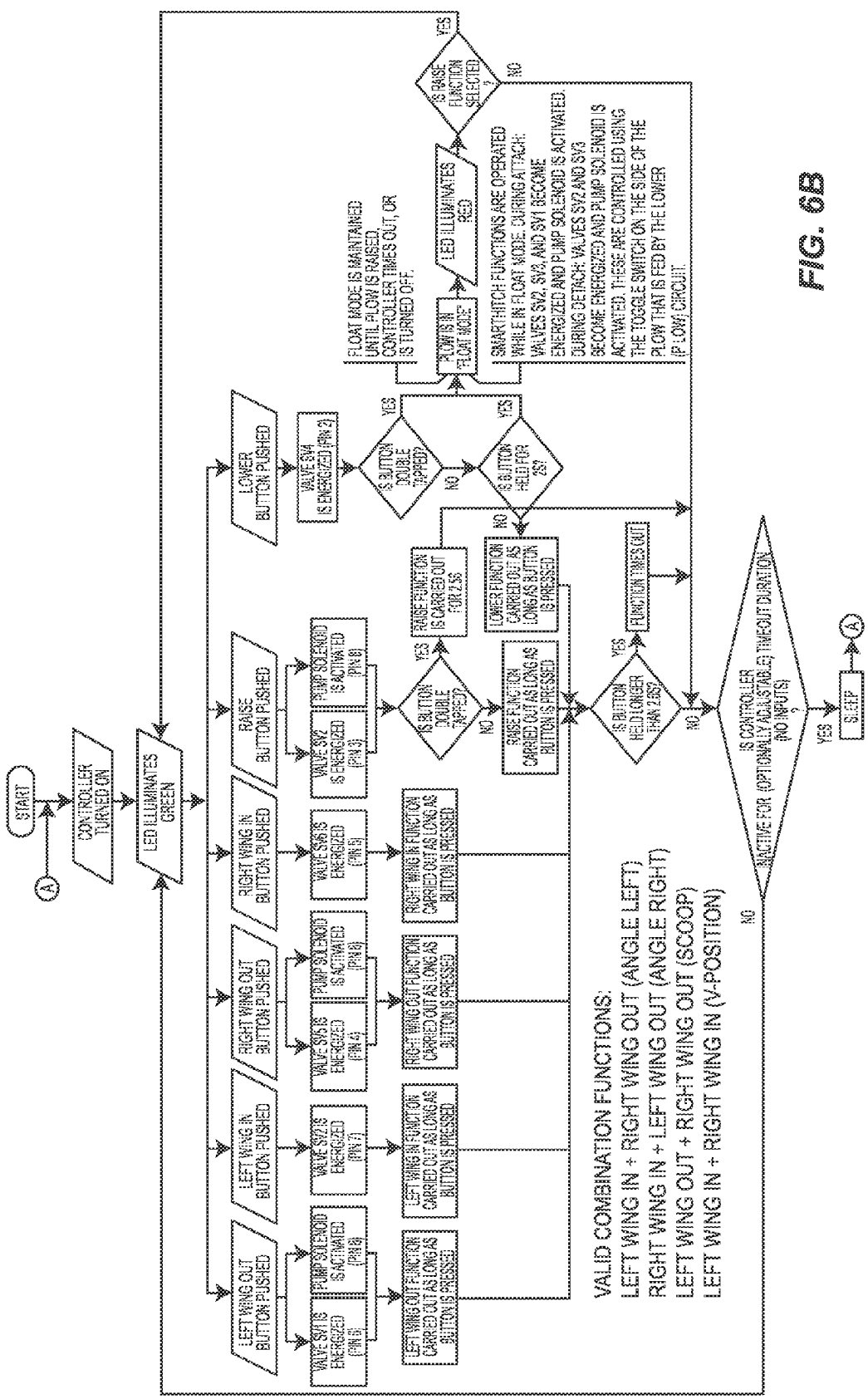
FIG. 6B illustrates an example flow chart of actions that may be taken by the wireless snow plow system of FIG. 1 to control a V-blade snow plow.

FIG. 6B illustrates an example flow chart of actions that may be taken by the wireless snow plow system 10 to control a V-blade snow plow when various user controls are activated or not activated (e.g., time-out) at the hand-held controller 18. The flows shown in FIG. 6B may apply to a hand-held controller 18, a PCM 12 and a VCM 15 that are synchronized for operation after the PCM 12 has been configured to support a V-blade plow.

The techniques, systems and methods discussed herein provide numerous benefits over conventional techniques and systems. For example, the large wiring harness and plug between the vehicle and the plow may be eliminated, as the wiring between the vehicle and the plow may be reduced to only a power cable 32 and a ground cable 30. Additionally, control of the snow plow lights may be automatically controlled by the system 10. For example, the wireless snow plow control system 10 may automatically sense a connection of a snow plow and may automatically disengage one or more vehicle lights and automatically engage one or more snow plow lights accordingly. Thus, the need for a wired connection and for a user switch to indicate whether snow plow lights or vehicle lights are to be engaged is eliminated. Furthermore, the techniques of the present disclosure may allow for more robust and reliable wireless control of the snow plow, as the three-unit system may provide an alternate wireless communication path in the event that the direct communication path between the hand-held controller and the plow control module is unsuitable or unusable.

Embodiments of the techniques described in the present disclosure may include any number of the following aspects, either alone or combination:

1. A system for wireless control of a snow plow that is mountable on a vehicle, comprising:
    a plow control module mounted on the snow plow; and
    a vehicle control module mounted on the vehicle that wirelessly communicates with the plow control module and is capable of:
        detecting a connection of the snow plow;
        disengaging, from operation, one or more vehicle lights mounted on the vehicle based on the detection of the connection of the snow plow; and
        controlling one or more plow lights mounted on the snow plow based on one or more signals corresponding to vehicle light control of the one or more vehicle lights.
2. The system of aspect 1, wherein the one or more plow lights include at least one of a plow headlight, a plow turn signal, a plow reverse light, or a plow daytime running lamp; and wherein the one or more vehicle lights include at least one of a vehicle headlight, a vehicle turn signal, a vehicle reverse light, or a vehicle daytime running lamp.
3. The system of aspect 1, wherein the one or more plow lights include a plow headlight and a plow turn signal, and wherein the one or more vehicle lights a vehicle headlight and a vehicle turn signal.
4. The system of aspect 1, wherein the detection of the connection of the snow plow to the vehicle is based on a wireless signal originated by the plow control module and received at the vehicle control module.
5. The system of aspect 1, wherein the vehicle control module is further capable of:
    detecting a disconnection of the snow plow; and
    re-engaging the one or more vehicle lights into operation based on the detection of the disconnection of the snow plow.
6. The system of aspect 1, wherein the one or more signals corresponding to vehicle light control of the one or more vehicle lights correspond to user manipulation of one or more operator controls for controlling the one or more vehicle lights.
7. The system of aspect 1, further comprising a harness interconnecting the vehicle control module and the one or more vehicle lights.
8. The system of aspect 7, wherein the harness is configured to redirect, to the vehicle control module instead of to the one or more vehicle lights, the one or more signals corresponding to vehicle light control of the one or more vehicle lights.

9. The system of aspect 1, wherein:
the vehicle control module is configured to cause wireless communications corresponding to the one or more signals corresponding to vehicle light control of the one or more vehicle lights to be delivered to the plow control module when the snow plow is connected, and
the vehicle control module is configured to cause communications corresponding to the one or more signals corresponding to vehicle light control of one or more vehicle lights to be delivered to the one or more vehicle lights when the snow plow is disconnected.

10. The system of aspect 1, wherein the vehicle control module is further capable of wirelessly communicating with the plow control module to control operations of the snow plow.

11. The system of aspect 10, further comprising a hand-held controller, and wherein the vehicle control module is capable of wirelessly communicating with the plow control module to control operations of the snow plow based on commands received from the hand-held controller.

12. The system of aspect 11, wherein at least a portion of the commands received from the hand-held controller are based on user input received at the hand-held controller.

13. A system for wireless control of a snow plow that is mountable on a vehicle, comprising:
a plow control module mounted on the snow plow and configured to wirelessly receive signals to control operations of the snow plow;
the vehicle control module mounted on the vehicle and in wireless connection with the plow control module and with a hand-held controller; and
the hand-held controller in wireless connection with the plow control module and with the vehicle control module, the hand-held controller having user activated controls thereon to cause the signals to control operations of the snow plow to be generated, and the hand-held controller configured to:
cause a particular signal to control a particular operation of the snow plow to be wirelessly transmitted to the plow control module, and
cause the particular signal to be wirelessly transmitted to the vehicle control module for retransmission to the plow control module when an indication that the particular signal was not received by the plow control module is determined.

14. The system of aspect 13, wherein each unit of the plow control module, the vehicle control module and the hand-held controller is synchronized with the other units.

15. The system of aspect 14, wherein the each unit of the plow control module, the vehicle control module and the hand-held controller is synchronized with the other units by transmission and reception of respective broadcast messages, each respective broadcast message including an indication of an identification of a respective transmitting unit.

16. The system of aspect 15, wherein the each unit of the plow control module, the vehicle control module and the hand-held controller stores the identification of each of the other units received in the respective broadcast messages.

17. The system of aspect 14, wherein the each unit of the plow control module, the vehicle control module and the hand-held controller is automatically synchronized with the other units.

18. The system of aspect 17, wherein the each unit of the plow control module, the vehicle control module and the hand-held controller is configured to attempt to automatically synchronize with the other units when the each unit is in a synchronization state.

19. The system of aspect 18, wherein the operations of the snow plow are prevented from occurring when at least of the plow control module, the vehicle control module, and the hand-held controller is in the synchronization state.

20. The system of aspect 13, wherein the vehicle control module is in wireless communication module with the plow control module further to control operations of one or more plow lights mounted on the snow plow.

21. The system of aspect 20, wherein the vehicle control module is further configured to cause wireless signals to be transmitted to the plow control module to control the operations of the one or more plow lights, the wireless signals based on signals corresponding to vehicle light control of one or more vehicle lights mounted on the vehicle.

22. The system of aspect 21, wherein the signals corresponding to vehicle light control of the one or more vehicle lights correspond to user input received by one or more operator controls corresponding to the one or more vehicle lights.

23. The system of aspect 21, wherein the one or more plow lights include at least one of: a plow headlight, a plow turn signal, or a plow daytime running lamp; and wherein the one or more vehicle lights include at least one of: a vehicle headlight, a vehicle turn signal, or a vehicle daytime running lamp.

24. The system of aspect 13, wherein the plow control module includes a toggle to switch between controlling two different types of snow plows.

25. The system of aspect 13, wherein the hand-held controller includes a bezel mounted thereon corresponding to a type of snow plow, the bezel modifying an accessibility of the user activated controls corresponding to the type of snow plow.

26. The system of aspect 13, wherein the plow control module includes an antenna to wirelessly receive the signals to control operations of the snow plow, the antenna being routed within a wiring loom surrounding a harness of the plow control module.

27. The system of aspect 13, wherein the indication that the particular signal was not received by the plow control module is a lack of reception of an acknowledgement by the plow control module to the particular signal.

28. A method of controlling a snow plow that is mountable on a vehicle, comprising:
synchronizing, using wireless communications, each unit of a group of units of a wireless snow plow control system with the other units of the wireless snow plow control system, the group of units including a plow control module mounted on the snow plow, a vehicle control module mounted on the vehicle, and a hand-held controller;
controlling the snow plow by wirelessly transmitting messages between the synchronized units, the messages based on user inputs received at the hand-held controller.

29. The method of aspect 28,
  further comprising causing the each unit to enter a synchronization state, and wherein:
    synchronizing the each unit with the other units comprises synchronizing the each unit with the other units when the each unit is in the synchronization state; and
    controlling the snow plow comprises controlling the snow plow after all units of the group of units have exited the synchronization state.
30. The method of aspect 29, wherein causing the each unit to enter the synchronization state includes receiving a user indication at the each unit to enter the synchronization state.
31. The method of aspect 29, wherein synchronizing the each unit with the other units comprises:
  receiving, at the each unit, a broadcast message including an indication of an identification of at least one of the other units;
  acknowledging, by the each unit to the at least one of the other units, the broadcast message; and
  storing, at the each unit, the indication of the identification of the at least one of the other units.
32. The method of aspect 31, wherein controlling the snow plow comprises controlling the snow plow only after indications of identifications of both of the other units are stored at the each unit.
33. The method of aspect 28, wherein synchronizing the each unit with the other units comprises:
  broadcasting, by the each unit, a message including an indication of an identification of the each unit;
  receiving an acknowledgement to the broadcast message, the acknowledgement including an indication of an identification of at least one of the other units; and
  storing, at the each unit, the indication of the identification of the at least one of the other units.
34. The method of aspect 33, wherein controlling the snow plow comprises controlling the snow plow only after indications of identifications of both of the other units are stored at the each unit.
35. A method of wirelessly controlling one or more lights mounted on a snow plow that is mountable on a vehicle substantially as herein before described with reference to and/or as shown in the accompanying drawings.
36. A method of wirelessly controlling a snow plow that is mountable on a vehicle substantially as herein before described with reference to and/or as shown in the accompanying drawings.
37. A system for wirelessly synchronizing a system for wireless control of a snow plow that is mountable on a vehicle as herein before described with reference to and/or as shown in the accompanying drawings.

It should also be understood that, unless a term is expressly defined in this patent using the sentence "As used herein, the term '_____' is hereby defined to mean ..." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed:
1. A system for wireless control of a snow plow that is mountable on a vehicle, comprising:
  a remote controller;
  a plow control module mounted on the snow plow and including a respective transceiver; and
  a vehicle control module mounted on the vehicle and including a respective transceiver that wirelessly communicates with the plow control module transceiver, the vehicle control module being capable of:
    detecting an availability of the plow control module; and
    based on the detection of the availability of the plow control module, (i) disengaging, from operation, one or more vehicle lights mounted on the vehicle; and (ii) controlling one or more plow lights mounted on the snow plow based on one or more signals corresponding to vehicle light control of the one or more vehicle lights.
2. The system of claim 1, wherein the one or more plow lights include at least one of a plow headlight, a plow turn signal, a plow reverse light, or a plow daytime running lamp; and wherein the one or more vehicle lights include at least one of a vehicle headlight, a vehicle turn signal, a vehicle reverse light, or a vehicle daytime running lamp.
3. The system of claim 1, wherein the one or more plow lights include a plow headlight and a plow turn signal, and wherein the one or more vehicle lights a vehicle headlight and a vehicle turn signal.
4. The system of claim 1, wherein the detection of the availability of the plow control module is based on a wireless signal originated by the plow control module and received at the vehicle control module.
5. The system of claim 1, wherein the vehicle control module is further capable of:
  detecting an unavailability of the plow control module; and
  re-engaging the one or more vehicle lights into operation based on the detection of the unavailability of the plow control module.
6. The system of claim 1, wherein the one or more signals corresponding to vehicle light control of the one or more vehicle lights correspond to user manipulation of one or more operator controls for controlling the one or more vehicle lights.
7. The system of claim 1, further comprising a harness interconnecting the vehicle control module and the one or more vehicle lights.

8. The system of claim 7, wherein the harness is configured to redirect, to the vehicle control module instead of to the one or more vehicle lights, the one or more signals corresponding to vehicle light control of the one or more vehicle lights.

9. The system of claim 1, wherein:
the vehicle control module is configured to cause wireless communications corresponding to the one or more signals corresponding to vehicle light control of the one or more vehicle lights to be delivered to the plow control module when the plow control module is available, and
the vehicle control module is configured to cause communication corresponding to the one or more signals corresponding to vehicle light control of one or more vehicle lights to be delivered to the one or more vehicle lights when the plow control module is unavailable.

10. The system of claim 1, wherein the vehicle control module is further capable of wirelessly communicating with the plow control module to control operations of the snow plow.

11. The system of claim 10, wherein the vehicle control module is capable of wirelessly communicating with the plow control module to control operations of the snow plow based on commands received from the remote controller.

12. The system of claim 11, wherein at least a portion of the commands received form the remote controller are based on user input received at the remote controller.

* * * * *

UNITED STATES PATENT AND TRADEMARK OFFICE
CERTIFICATE OF CORRECTION

PATENT NO. : 9,194,091 B2  
APPLICATION NO. : 13/778357  
DATED : November 24, 2015  
INVENTOR(S) : James E. Moon, Jr. et al.

Page 1 of 1

It is certified that error appears in the above-identified patent and that said Letters Patent is hereby corrected as shown below:

In the Claims:

At Column 19, line 25, "form" should be -- from --.

Signed and Sealed this  
Fifth Day of July, 2016

Michelle K. Lee  
*Director of the United States Patent and Trademark Office*